US009547430B2

(12) United States Patent
Paek et al.

(10) Patent No.: US 9,547,430 B2
(45) Date of Patent: Jan. 17, 2017

(54) PROVISION OF HAPTIC FEEDBACK FOR LOCALIZATION AND DATA INPUT

(71) Applicant: Microsoft Corporation, Redmond, WA (US)

(72) Inventors: Timothy S. Paek, Sammamish, WA (US); Johnson Apacible, Mercer Island, WA (US); Bongshin Lee, Issaquah, WA (US); Asela Gunawardana, Seattle, WA (US); Vishwas Kulkarni, Redmond, WA (US); Hong Z. Tan, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 13/787,832

(22) Filed: Mar. 7, 2013

(65) Prior Publication Data

US 2014/0101545 A1 Apr. 10, 2014

Related U.S. Application Data

(63) Continuation-in-part of application No. 13/745,860, filed on Jan. 20, 2013.
(Continued)

(51) Int. Cl.
G06F 3/0488 (2013.01)
G06F 3/01 (2006.01)

(52) U.S. Cl.
CPC ............ *G06F 3/0488* (2013.01); *G06F 3/016* (2013.01); *G06F 3/04886* (2013.01)

(58) Field of Classification Search
CPC ..... G06F 3/016; G06F 3/04886; G06F 3/0488
See application file for complete search history.

(56) References Cited

U.S. PATENT DOCUMENTS 5,544,295 A 8/1996 Capps
2003/0122779 A1* 7/2003 Martin et al. ................. 345/156
(Continued)

FOREIGN PATENT DOCUMENTS

CN 102375691 A 3/2012
EP 2079010 A2 7/2009
(Continued)

OTHER PUBLICATIONS

"International Search Report & Written Opinion for PCT Application No. PCT/US2013/063956", Mailed Date: Apr. 11, 2014, Filed Date: Oct. 9, 2013, 15 pages.
(Continued)

*Primary Examiner* — Jeffrey A Gaffin
*Assistant Examiner* — Mandrita Brahmachari
(74) *Attorney, Agent, or Firm* — Steve Wight; Sandy Swain; Micky Minhas

(57) ABSTRACT

Various technologies pertaining to provision of haptic feedback to users of computing devices with touch-sensitive displays are described. First haptic feedback is provided to assist a user in localizing a finger or thumb relative to a graphical object displayed on a touch-sensitive display, where no input data is provided to an application corresponding to the graphical object. A toggle command set forth by the user is subsequently identified; thereafter, an input gesture is received on the touch-sensitive display, and second haptic feedback is provided to aid the user in setting forth input data to the application.

20 Claims, 17 Drawing Sheets

Related U.S. Application Data

(60) Provisional application No. 61/712,155, filed on Oct. 10, 2012.

(56) References Cited

U.S. PATENT DOCUMENTS

| | | | |
|---|---|---|---|
| 2009/0117943 A1* | 5/2009 | Lee et al. | 455/566 |
| 2010/0161522 A1* | 6/2010 | Tirpak et al. | 706/11 |
| 2010/0235726 A1 | 9/2010 | Ording et al. | |
| 2010/0241985 A1 | 9/2010 | Kim et al. | |
| 2010/0277414 A1 | 11/2010 | Tartz et al. | |
| 2010/0315345 A1* | 12/2010 | Laitinen | 345/173 |
| 2011/0285666 A1 | 11/2011 | Poupyrev | |
| 2012/0113008 A1* | 5/2012 | Makinen et al. | 345/168 |
| 2012/0162078 A1 | 6/2012 | Ferren et al. | |
| 2012/0256848 A1 | 10/2012 | Srinivasan et al. | |

FOREIGN PATENT DOCUMENTS

| | | |
|---|---|---|
| GB | 2474047 A | 4/2011 |
| WO | 2012155776 A1 | 11/2012 |

OTHER PUBLICATIONS

"International Search Report & Written Opinion for PCT Application No. PCT/US2013/063965", Mailed Date: Feb. 6, 2014, Filed Date: Oct. 9, 2013, 8 Pages.

Yatani, et al., "Investigating Effects of Visual and Tactile Feedback on Spatial Coordination in Collaborative Handheld Systems", Retrieved at <<http://yatani.jp/paper/CSCW2012.pdf>> Proceedings: Conference on Computer Supported Cooperative Work, Feb. 11, 2012, pp. 1-10.

Pasquero, et al., "A Haptic Wristwatch for Eyes-Free Interactions", Retrieved at <<http://iknowjerome.squarespace.com/storage/Pasquero-et-al-CHI2011.pdf>> Proceedings: Conference on Human Factors in Computing Systems, May 7, 2011, pp. 1-10.

Lin, et al., "PUB—Point upon Body: Exploring Eyes-Free Interaction and Methods on an Arm", Retrieved at <<http://graphics.csie.ntu.edu.tw/~keynes/research/pub2011/resources/PUB.pdf>> Symposium on User Interface Software and Technology, Oct. 16, 2011, pp. 1-7.

Dai, et al., "SlickFeel: Sliding and Clicking Haptic Feedback on a Touchscreen", Retrieved at <<https://engineering.purdue.edu/~hongtan/pubs/PDFfiles/RIE2_Dai_etal_UIST2012.pdf>> Proceedings: Symposium on User Interface Software and Technology, Oct. 7, 2012, pp. 1-2.

Cockburn, et al., "Air pointing: Design and Evaluation of Spatial Target Acquisition with and without Visual Feedback", Retrieved at <<http://www.dgp.toronto.edu/—bonzo/docs/Air%20Pointing.pdf>> Proceedings: International Journal of Human-Computer Studies, vol. 69, Issue.6, Jun. 2011, pp. 1-14.

Gupta, et al., "SqueezeBlock: Using Virtual Springs in Mobile Devices for Eyes-Free Interaction", Retrieved at <<http://dub.washington.edu/djangosite/media/papers/tmpPo5TLY.pdf>> Proceedings: Symposium on User Interface Software and Technology, Oct. 3, 2011, pp. 1-4.

"First Office Action and Search Report Issued in Chinese Patent Application No. 201380052074.3", Mailed Date: Aug. 17, 2016, 12 Pages.

\* cited by examiner

PROVISION OF HAPTIC FEEDBACK FOR LOCALIZATION AND DATA INPUT

RELATED APPLICATIONS

This application claims the benefit of U.S. Provisional Patent Application No. 61/712,155, filed on Oct. 10, 2012, and entitled "ARCED OR SLANTED SOFT INPUT LABELS." This application is additionally a continuation-in-part of U.S. patent application Ser. No. 13/745,860, filed on Jan. 20, 2013, and entitled "TEXT ENTRY USING SHAPEWRITING ON A TOUCH-SENSITIVE INPUT PANEL." The entireties of these applications are incorporated herein by reference.

Mobile computing devices have been configured to display soft input panels, where a user can generate text by selecting buttons of a soft input panel. Typically, on mobile computing devices, each key on a soft input panel represents a single character. Accordingly, for a user to input text to a mobile computing device using a soft input panel, the user can select (e.g., through tapping) discrete keys that are representative of respective characters that are desirably included in such text. As many mobile computing devices have relatively small screens, such computing devices have been configured with software that performs spelling corrections and/or corrects for "fat finger syndrome," where a user mistakenly taps a key that is proximate to a desirably tapped key.

Conventionally, it is very difficult for a user to accurately enter text using a soft input panel when the user is unable to continuously view the screen upon which the soft input panel is displayed. For mobile computing devices, this can be at least partially attributed to the relatively small size of the screen, and therefore, the relatively small size of keys included in the soft input panel displayed on the screen. For instance, on an exemplary soft input panel displayed on a mobile telephone, ten separate keys may exist in a single row of keys. It may therefore be difficult for the user to remember which keys are in which rows. Even if the user remembers which keys are in which rows, it may remain difficult for the user to tap a particular key in the soft input panel without looking directly at the soft input panel.

SUMMARY

The following is a brief summary of subject matter that is described in greater detail herein. This summary is not intended to be limiting as to the scope of the claims.

Various technologies pertaining to providing haptic feedback to a user of a computing device that has a touch-sensitive display to assist the user in setting forth input data to such computing device are described herein. For example, a mobile computing device may include a touch-sensitive display, wherein a user of the mobile computing device can provide input thereto via interaction with the touch-sensitive display. Haptic feedback can initially be provided to the user to assist the user in initially orienting a digit (e.g., thumb or finger) relative to graphical objects displayed on the touch-sensitive display. Specifically, first haptic feedback can be provided to the digit of the user as the digit transitions over a surface of the touch-sensitive display, wherein the first haptic feedback is provided to assist the user in determining locations of such graphical objects on the touch-sensitive display without having to view the touch-sensitive display.

Subsequent to the user orienting the digit as desired on the touch-sensitive display (e.g., on a particular graphical object), the user can set forth a toggle command. The toggle command can indicate that the user has positioned the digit at a desired location/orientation, and now desires to provide input to the mobile computing device. Such toggle command may be a double tap, applying additional pressure to the touch-sensitive display via the digit, shaking of the mobile computing device, a voice command, or the like. Responsive to detecting the toggle command, subsequent gestures set forth by the user can be interpreted as input gestures, such that input is provided to an operating system and/or application executing on the mobile computing device. For certain applications, such as a text entry application that employs a soft input panel to receive input from the user, haptic feedback can be continued to be provided to the user of the mobile computing device, such that the user maintains awareness of position of the digit as it transitions over the surface of the mobile computing device. Such an embodiment may be particularly beneficial when the text entry application receives input data by way of shapewriting, where the user selects keys in the soft input panel by connecting them with strokes, rather than discretely tapping such keys.

In an exemplary embodiment, a soft input panel comprising a plurality of keys can be displayed on a touch-sensitive display of a computing device. For instance, the user of the computing device may desirably employ the touch-sensitive display to input text to an application executing on the computing device without being forced to look at the touch-sensitive display. For example, the user may be watching a movie, and may wish to transmit a message to a friend without averting her eyes from the movie. In another example, the user may be watching a speaker and may wish to take notes about a presentation set forth by such speaker without taking her eyes off of the speaker. The user can set a digit (thumb, finger, or stylus) on the display of the touch-sensitive display and begin transitioning the digit over the surface of the touch-sensitive display. Haptic feedback can be provided to the user to assist the user in identifying location of keys of the soft input panel. For example, haptic feedback can be provided such that the user perceives an increase in friction as the digit transitions over borders between keys of the soft input panel. In another example, haptic feedback can be provided in a checkerboard pattern, such that the user perceives that a first area of the touch-sensitive display where a first key is displayed has a rougher surface when compared to a second, adjacent area of the touch-sensitive display where a second key is displayed. Thus, by transitioning the digit over the touch-sensitive display, the haptic feedback can assist the user in ascertaining that the digit is resting upon a certain key in the soft input panel without having to look at the touch-sensitive display.

While the user is transitioning the digit over the surface of the touch-sensitive display for purposes of localization, input is not provided to an application on the mobile computing device. To provide input to an application on the mobile computing device (e.g., to generate text using the soft input panel), the user can set forth a toggle command, such as a double tap or depressing the digit with increased pressure on the touch-sensitive display.

After this toggle command is received, the computing device is configured to identify subsequent input gestures set forth by the user. For example, the user can set forth a tap on a particular key, which indicates that the user desires to input a character represented by such key. In another example, the computing device can be configured to generate text by way of shapewriting, where instead of tapping discrete keys to select characters, the user connects keys that represent desired characters by transitioning the digit over the surface of the touch-sensitive display while maintaining contact with such display. Accordingly, to input the word "hello," rather than tapping discrete keys representative of the letters "h," "e," "l," "l," and "o," the user transitions the digit over the touch-sensitive display to connect keys that represent the characters "h," "e," "l," and "o." In such an embodiment, the computing device can output haptic feedback to assist the user in understanding locations of keys in the soft input panel relative to the digit is as the digit transitions over the soft input panel. As noted above, haptic feedback can be provided at borders of keys in the soft input panel or as the user transitions over keys themselves to assist the user in recognizing/remembering locations of keys on the soft input panel as the user is generating input data. Combining shapewriting with haptic feedback can assist the user in generating text without being forced to constantly look at the display of the computing device.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
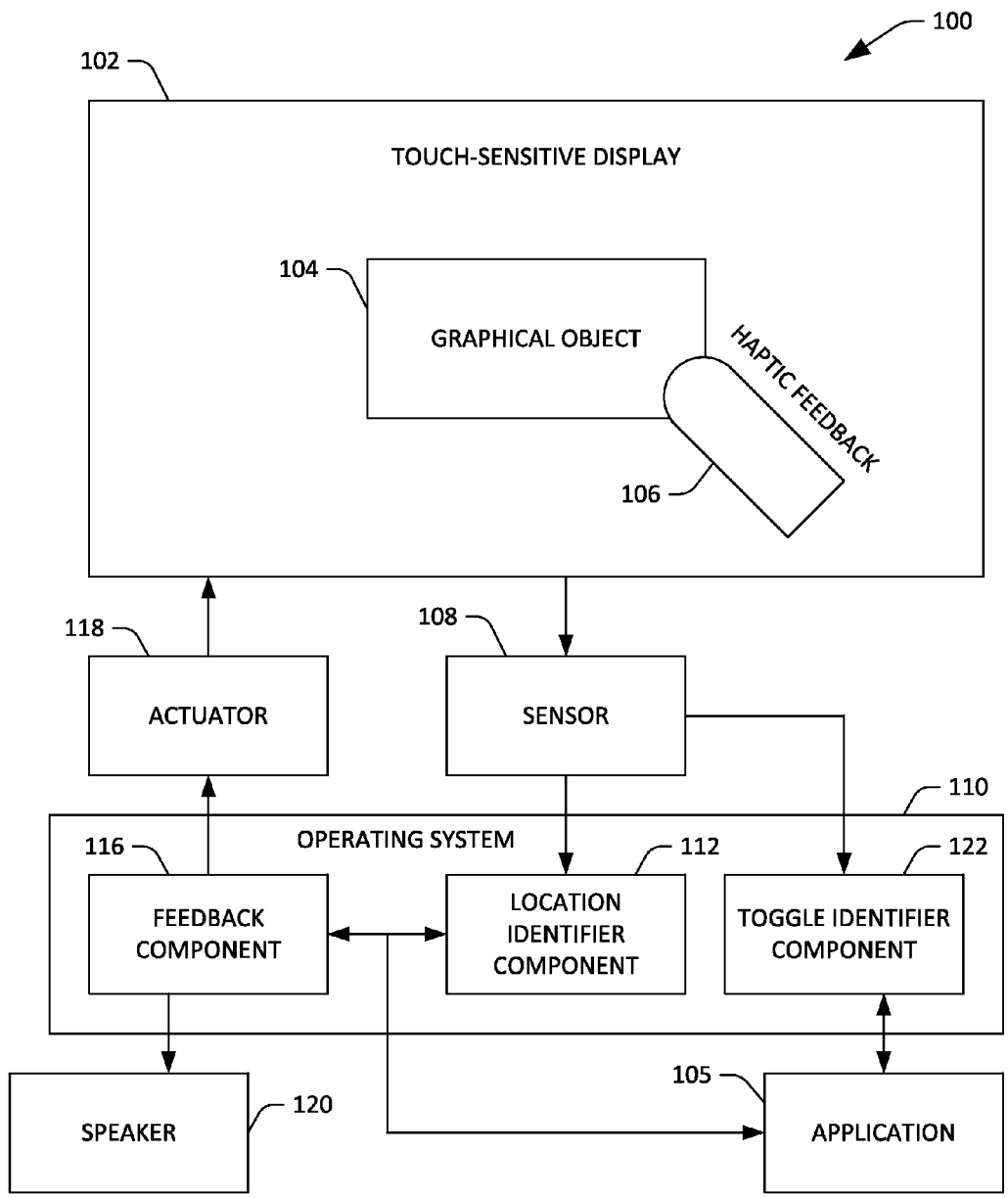
FIG. 1 is a functional block diagram of an exemplary system that facilitates assisting a user in connection with providing input to a computing device by way of providing haptic feedback as the user interacts with a touch-sensitive display of the computing device.

Various technologies pertaining to providing haptic feedback to users of computing devices to assist such users in localizing their finger or thumb relative to a graphical object displayed on a touch-sensitive display, as well as assisting users in providing input to computing devices that include touch-sensitive displays, will now be described with reference to the drawings, where like reference numerals represent like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, the term "exemplary" is intended to mean serving as an illustration or example of something, and is not intended to indicate a preference.

With reference now to FIG. 1, an exemplary system 100 that facilitates provision of haptic feedback to a user of a computing device with a touch-sensitive display, wherein provision of haptic feedback is provided to assist the user in connection with interacting with at least one application installed on the computing device, is illustrated. In an exemplary embodiment, the application can be a text entry application that utilizes a soft input panel to receive input as to desirably entered text from a user of the computing device, wherein the soft input panel comprises a plurality of keys. In another example, haptic feedback can be provided to assist the user in locating and selecting a graphical icon that causes an application represented by the graphical icon to be initiated. Specifically, the haptic feedback can be provided in connection with assisting the user in developing muscle memory, thereby allowing the user to interact with graphical objects displayed on a touch-sensitive display without the user having to continuously look at the touch-sensitive display. Various types of haptic feedback technologies are contemplated, including but not limited to surface friction modulation that is accomplished through use of electrostatic force, ultrasonic vibration, etc.

The system 100 is comprised by a computing device, which in an exemplary embodiment, may be a mobile computing device, such as a mobile telephone, tablet (slate) computing device, mobile media player, or the like. The system 100 comprises a touch-sensitive display 102, which has a consistently smooth surface. While, for purposes of explanation, technologies are described herein that utilize a touch-sensitive display, it is to be understood that such technologies can be adapted for utilization on a smooth input surface, which may or may not include a display. That is, as described herein, haptic feedback can be presented to a user to assist in creating a non-visual representation of an entity or collection of entities (such as keys on a keyboard), to assist in allowing the user with localizing a digit relative to the entity or collection of entities, and to assist the user with providing input to a computing device by way of the entity or collection of entities. Accordingly, the graphical objects displayed on touch-sensitive displays described herein are not intended to limit the concepts described herein to displays.

A graphical object 104 is displayed on the touch-sensitive display 102, wherein the graphical object 104 represents or is a portion of a graphical user interface (GUI) of a computer executable application 105 that is installed on the computing device. As will be described in greater detail herein, the application 105 may be a text entry application that is configured to recognize user input with respect to a soft input panel displayed on the touch-sensitive display 102 and generate text based upon such user input. Such text may be or include alphabetical characters, numbers, or the like— thus, for example, a user may set forth a telephone number by way of the text entry application. Accordingly, the graphical object 104 may be a key amongst a plurality of keys, a selectable widget that, when selected by the user, causes the application to be initiated, etc.

As noted above, the system 100 facilitates eyes-free interaction with graphical objects displayed on the touch-sensitive display 102. That is, the system 100 is configured to allow the user of the computing device to provide input data to the computing device without requiring the user to look at the touch-sensitive display 102 when providing such input data. This can be accomplished by, for example, providing haptic feedback to the user to assist the user in localizing a digit 106 relative to the graphical object 104 prior to interpreting user interaction with the touch-sensitive display as being an input gesture. In other words, haptic feedback can be provided for purposes of allowing the user to recognize, for example, that the digit 106 is in contact with the touch-sensitive display 102 at a certain location relative to the graphical object 104 (e.g., at a border surrounding the graphical object 104, somewhere on the graphical object 104, at a center of the graphical object, etc.). For instance, with respect to a soft input panel, once the user understands that the digit 106 is in contact with the touch-sensitive display 102 on a particular key of the soft input panel, the user can remember locations of other keys in the soft input panel relative to such key.

Subsequent to the user localizing the digit 106 relative to the graphical object 104, the user can employ one or more gestures to cause input to be provided to the application 105 (or operating system) relatively accurately without having to direct her eyes to the touch-sensitive display 102. Further, the system 100 is configured to provide haptic feedback to the user as the user is setting forth input to the application 105 (or operating system). For example, after it has been determined that the user has localized the digit 106 relative to the graphical object 104, the system 100 can be configured to provide further haptic feedback as the digit 106 of the user is employed to provide input data to the application 105.

With more detail pertaining to operation of the system 100, the system 100 comprises a sensor 108 that outputs a signal that is indicative of a real-time location of the digit 106 on the touch-sensitive display 102 when such digit 106 is in contact with (or hovering above) the surface of the touch-sensitive display 102. Accordingly, the signal output by the sensor 108 can be monitored to indicate whether the digit 106 is in contact with the surface of the touch-sensitive display 102 and where on the touch-sensitive display 102 the digit 106 is in contact with such display.

The system 100 additionally comprises an operating system 110 that manages hardware resources, such that the operating system can be configured to cause power to be provided to the sensor 108 and to monitor output of the sensor 108. The operating system 110 comprises a location identifier component 112 that monitors the signal output by the sensor 108 and determines that the digit 106 is in contact with the touch-sensitive display 102 at a location corresponding to the graphical object 104. The location corresponding to the graphical object 104 may be a border between the graphical object 104 and some other graphical object (not shown). In an example, the location corresponding to the graphical object 104 may be anywhere on the graphical object 104. In still yet another example, the location corresponding to the graphical object 104 may be on a center of the graphical object 104. The location identifier component 112 determines that the digit 106 is in contact with the touch-sensitive display 102 at the location corresponding to the graphical object 104 based upon the signal output by the sensor 108 and information provided by the application 105 (or known by the operating system 110) about the graphical object 104. For example, the application 105 can provide the location identifier component 112 with information as to where the graphical object 104 is to be displayed on the touch-sensitive display 102.

The operating system 110 additionally comprises a feedback component 116 that, responsive to the location identifier component 112 determining that the digit 106 is in contact with the touch-sensitive display at the location corresponding to the graphical object 104, causes an actuator 118 to provide haptic feedback to indicate to the user that the digit 106 is in contact with the touch-sensitive display 102 at the location corresponding to the graphical object 104. In an exemplary embodiment, the actuator 118 can control an electric signal that is provided to a conducting layer of the touch-sensitive display, wherein changes in the electric signal cause the user to perceive changes in friction on the touch-sensitive display 102 as the digit 106 transitions over the touch-sensitive display 102. Accordingly, for example, it may be desirable to provide haptic feedback to the user when the digit 106 is in contact with any portion of the touch-sensitive display 102 where the graphical object 104 is displayed.

Upon the location identifier component 112 detecting that the digit 106 is in contact with the touch-sensitive display 102 on the graphical object, the feedback component 116 can cause the actuator 118 to increase an amount of current provided to a conductive layer of the touch-sensitive display 102, thereby inducing the user to perceive a change in friction (electrostatic friction). That is, the user can be caused to perceive that the surface of the touch-sensitive display 102 is rougher when the digit 106 is transitioning over the graphical object 104 compared to when the digit 106 is not transitioning over the graphical object 104.

Therefore, without having to look at the touch-sensitive display 102, the user can determine the location of the graphical object 104 on the touch-sensitive display 102. When the location identifier component 112 determines that the digit 106 has transitioned off of the graphical object 104, the feedback component 116 can cause the actuator 118 to decrease the current provided to the conductive layer of the touch-sensitive display 102, thereby causing the user to perceive a change in friction (e.g., the surface of the touch-sensitive display feels smoother to the user) when the digit 106 has transitioned off of the graphical object 104. While the actuator 118 has been described as providing an electric signal in connection with generating electrostatic friction on the surface of the touch-sensitive display 102, it is to be understood that other technologies can be employed in connection with providing haptic feedback to the user. For example, the actuator 118 may be used to generate ultrasonic vibrations, may use piezoelectric actuator in connection with providing haptic feedback, etc.

Furthermore, it is to be understood that the haptic feedback described above is provided for purposes of localizing the digit 106. That is, initially, while the digit 106 is transitioning over the touch-sensitive display 102, such transitioning is not interpreted by the operating system 110 or the application 105 as being an input gesture (a gesture set forth by the user to provide input to the application 105 or the operating system 110). For instance, if the graphical object 104 is a key in a soft input panel, the transitioning of the digit 106 over the graphical object 104 does not cause a character represented by the key to be selected.

The system 100 can optionally comprise a speaker 120 that is in communication with the feedback component 116, wherein the speaker 120 is configured to provide audible feedback to the user as the digit 106 transitions over the surface of the touch-sensitive display 102. For example, the feedback component 116 can cause the speaker 120 to output a particular tone or word that is unique to the graphical object 104 when the digit 106 is in contact with the touch-sensitive display 102 on the graphical object 104. Additionally, the feedback component 116 can cause the speaker 120 to output an audible signal that is indicative of a velocity or acceleration of the digit 106 over the touch-sensitive display 102. Such audible cues can assist the user in remembering where graphical objects are located relative to one another on the touch-sensitive display 102.

Subsequent to the user localizing the digit 106 relative to the graphical object 104 on the touch-sensitive display 102, the user may wish to set forth an input gesture that causes input data to be provided to the application 105 that corresponds to the graphical object 104. As noted above, the graphical object 104 may be a certain key in a soft input panel from amongst a plurality of keys, and after the user localizes the digit 106 relative to the certain key, the user may wish to enter text by way of the soft input panel. Accordingly, the user can set forth a toggle command that indicates to the system 100 that the user wishes to provide input data to the application 105 or operating system 110. The operating system 110 comprises a toggle identifier component 122 that recognizes the toggle command set forth by the user. Such toggle command may be any suitable command including, but not limited to, an increased amount of pressure applied to the touch-sensitive display by the digit 106.

Thus, the sensor 108 (which can represent multiple sensors) can comprise a pressure sensor that outputs a signal that is indicative of an amount of pressure applied to the touch-sensitive display 102 by the digit 106. The toggle identifier component 122 can monitor such signal output by the sensor 108 to ascertain when pressure set forth by the digit 106 on the touch-sensitive display 102 is above a threshold. In another example, the sensor 108 can be configured to analyze an amount of surface area of the digit 106 that is in contact with the touch-sensitive display 102. As can be ascertained, an increase in the surface area of the digit 106 in contact with the touch-sensitive display 102 is indicative of an amount of pressure being applied to the surface of the touch-sensitive display 102 via the digit 106. The toggle identifier component 122 can recognize the increased surface area of the digit 106 in contact with the touch-sensitive display 102 as being the toggle command. In another exemplary embodiment, the sensor 108 can be configured to analyze pressure applied by the user to a bezel of a computing device comprising the touch-sensitive display 102, and the toggle identifier component 122 can identify the toggle command if the pressure applied to the bezel, as detected by the sensor 108, exceeds a predefined threshold.

In still other embodiments, the user can quickly shake the computing device to indicate that input data is desirably provided to the application 105 and/or operating system 110, may tilt the computing device to a particular angle to indicate that input data is desirably provided to the application 105 or operating system 110, may perform a tap or double tap to indicate that input data is desirably provided the application 105 or operating system 110, may output a voice command, etc. Thus, the sensor 108 can be or include a gyroscope, an accelerometer, a pressure sensor, a microphone (to detect a voice command), or the like. The toggle identifier component 122 can recognize the toggle command and can inform the location identifier component 112 that a subsequent gesture set forth by the user through utilization of the digit 106 is to be interpreted as an input gesture used to set forth input data to the application 105 and/or operating system 110.

In still yet another exemplary embodiment, the user can orient the digit 106 relative to the touch-sensitive display 102 in a particular manner to indicate a desire to set forth the toggle command, and the sensor 108 can output a signal that is indicative of orientation of the digit 106. The toggle identifier component 122 can identify the toggle command based at least in part upon the signal output by the sensor 108. For example, the sensor 108 can output a signal that is indicative of capacitive disturbance caused by the digit 106 being in contact with the touch-sensitive display at particular orientations, and the toggle identifier component 122 can determine the orientation of the digit 106 based upon such signal. If the orientation of the digit 106 is detected as being at a particular orientation, then the toggle identifier component 122 can determine that the user wishes to set forth a toggle command.

Therefore, subsequent to the toggle identifier component 122 recognizing the toggle command set forth by the user, the user can employ the digit 106 to set forth an input gesture relative to the graphical object 104. Such input gesture may be a swipe, a tap, a hover, an increase in pressure applied to the touch-sensitive display 102, or some other suitable input gesture. The location identifier component 112 can recognize that the digit 106 is at a particular location on the touch-sensitive display 102 relative to the graphical object 104, and can provide such data to the application 105 or operating system 110 as input data. The application 105 or operating system 110 may then interpret this input data in conventional manners.

Additionally, when gestures set forth by the digit 106 are to be interpreted as input gestures (subsequent to the user localizing digit 106 relative to the graphical object 104), the system 100 can provide haptic feedback to assist the user in setting forth input data to the application or operating system 110. For example, if the application 105 is configured to accept a swipe over numerous graphical objects as input, the feedback component 116 can cause the actuator 118 to provide haptic feedback, such that the user can recognize which graphical objects are being transitioned over by the digit 106 without requiring the user to look at the touch-sensitive display 102. Similarly, the feedback component 116 can cause the speaker 120 to output audible signals that can assist the user in understanding location of the digit 106 relative to the graphical object 104 (and other graphical objects) on the touch-sensitive display 102.

The utilization of haptic feedback in connection with localization of the digit 106 relative to the graphical object 104 when the user is setting forth input data to the application 105 or operating system 110 assists the user in connection with developing muscle memory when interacting with the application 105 or operating system 110 through use of the touch-sensitive display 102. For example, after a relatively small number of times that the user transitions the digit 106 over the touch-sensitive display 102, where location of graphical objects thereon is consistent, the user can quickly understand the location of the digit 106 (e.g., with a single swipe) relative to the graphical object 104 using muscle memory. Likewise, when the user is providing input data, particularly when using a swipe, the utilization of haptic feedback can assist the user in developing muscle memory, such that repeated input gestures can be undertaken relatively accurately.

Figure 2:
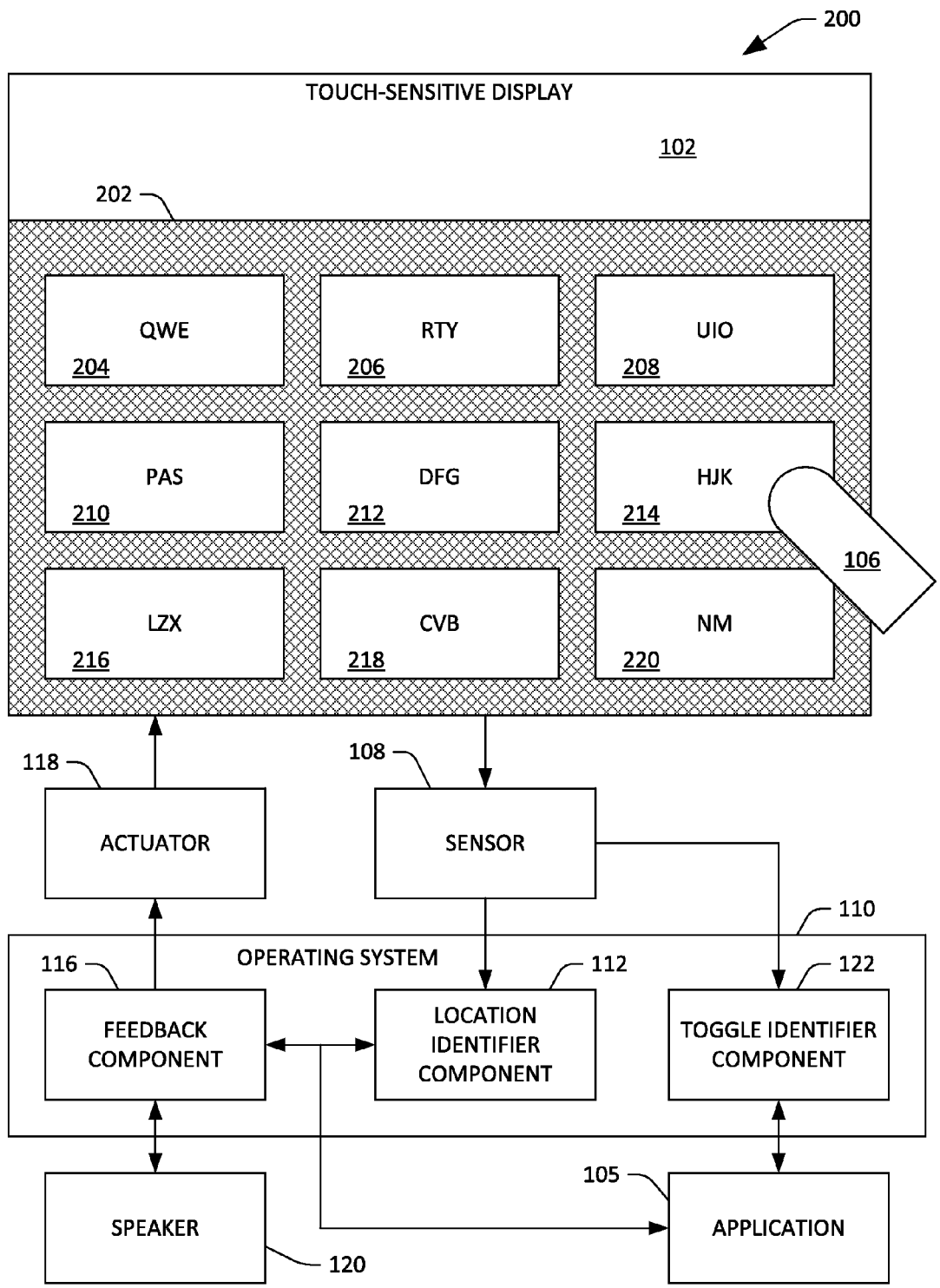
FIG. 2 is a functional block diagram of an exemplary system that illustrates portions of a soft input panel where haptic feedback is provided when a digit of the user is transitioning over such portions.

With reference now to FIG. 2, an exemplary system 200 that utilizes haptic feedback to assist a user in localizing the digit 106 relative to at least one graphical object displayed on the touch-sensitive display 102, as well as setting forth input to the application 105, is illustrated. In the exemplary system 200, the application 105 is a text entry application that utilizes a soft input panel 202 to receive input data from a user, wherein the input data is indicative of a sequence of characters that is desirably generated by the user. Further, it is to be understood that while the application 105 is shown as being separate from the operating system 110, the application 105 may be considered to be a portion of the operating system 110. In an exemplary embodiment, the application 105 may be a text messaging application, wherein a sequence of characters set forth by a user is desirably transmitted to a contact of such user. In another exemplary embodiment, the application 105 can be a word processing application that allows the user to generate and retain text in the form of a computer-readable document. In still yet another example, the application 105 may be a web browser, where text in the form of a URL may be desirably placed in a field of the web browser. Moreover, the application 105 may be a social networking application, where text is desirably generated to set forth a status update or broadcast a message. Other applications are also contemplated.

The soft input panel 202 shown in FIG. 2 may be particularly well-suited for utilization on a mobile computing device, such as a mobile telephone, wherein real estate on the touch-sensitive display 102 is relatively limited. The soft input panel 202 comprises a plurality of keys 204-220. While FIG. 2 illustrates that the soft input panel 202 includes nine keys, it is to be understood that the soft input panel 202 may include more or fewer keys. Furthermore, each key in the soft input panel is shown as representing a plurality of characters. In other embodiments, the soft input panel 202 may include a subset of keys that respectively represent a single character, as well as keys that represent multiple characters. Other exemplary layouts of soft input panels are set forth herein.

In the exemplary system 200, the feedback component 116 is configured to cause the actuator 118 to provide haptic feedback when the digit 106 of the user is located at respective borders between keys of the soft input panel 202. In other words, the feedback component 116 causes the actuator 118 to provide haptic feedback to the user when the digit is located in the shaded region of the soft input panel 202.

In an example, when the user wishes to localize the digit 106 relate to the key 214, the user can place the digit 106 at a bottom right-hand corner of the touch-sensitive display 102. For instance, the user may wish to generate the word "hello." The user must first, however, locate the key 214 that represents the letter "h." The user can cause the digit 106 to transition upwardly, and the location identifier component 112 can recognize the location of the user relative to the shaded regions of the soft input panel 202 and the keys 204-220 of the soft input panel 202. The feedback component 116 can cause the actuator 118 to selectively provide haptic feedback to the user based upon the location on the touch-sensitive display 102 that is being contacted by the digit 106. For instance, initially, as the digit 106 transitions from the bottom of the touch-sensitive display 102, haptic feedback can be provided to the user (the user can perceive that surface of the touch-sensitive display 102 is somewhat rough). Responsive to the location identifier component 112 determining that the digit 106 reaches the key 220, the feedback component 116 can cause the actuator 118 to cease providing haptic feedback to the user. Thus, the user can perceive that the digit 106 is on a key (e.g., the key 220) as the digit 106 transitions upwardly over such key 220. Thereafter, the location identifier component 112 determines that the digit 106 reaches the border between the key 220 and the key 214, and responsive thereto, the feedback component 116 causes the actuator 118 to provide haptic feedback to the user. Again, the user can perceive increased friction as the digit 106 transitions over such border, indicating to the user that the digit 106 is transitioning over a border between keys. After the digit 106 has transitioned over such border, the location identifier component 112 determines that the digit 106 is on an area of the touch-sensitive display 102 upon which the key 214 is displayed. Responsive to such determination, the feedback component 116 causes the actuator 118 to cease providing haptic feedback. Therefore, when the digit 106 is transitioned over a region of the touch-sensitive display upon which the key 214 is displayed, the user will perceive that such region is smooth (compared to when the digit 106 is transitioned over a border). Using muscle memory, then, the user can quickly determine the location of the key 214 (and other keys in the soft input panel 202) based upon the perception of smooth and rough surfaces on the touch-sensitive display 102.

As mentioned above, the user may wish to generate the word "hello" through utilization of the soft input panel 202. To inform the computing device that the user intends to set forth input data to the application 105, the user, in an example, can increase an amount of pressure applied to the touch-sensitive display 102 by the digit 106. The toggle identifier component 122 recognizes such increased pressure as a toggle command, such that subsequent gestures set forth through utilization of the digit 106 are interpreted as input gestures, where input data is provided to the application 105. For instance, after the user has identified that the digit 106 rests upon the key 214, the user can set forth the toggle command and subsequently perform some input gesture that causes data to be provided to the application 105. Therefore, after setting forth the toggle command, the user can tap the key 214 with the digit 106. Thereafter, as the user may be aware of the location of the key 204 (representing the character "e") relative to the key 214, the user can lift the digit 106 from the surface of the touch-sensitive display 102 and through multi-tap techniques, select the key 204 an appropriate number of times to indicate that the letter "e" is desirably selected. Thereafter, the user can lift the digit 106 and select the key 216 (e.g., potentially tapping the key 216 twice two separate times to select the letter "l" twice), and finally may lift the digit 106 and select the key 208.

In another exemplary embodiment that will be set forth in greater detail below, the application soft input panel 202 can be configured to receive input by way of shapewriting. Thus, rather than the user lifting the digit 106 and tapping discrete keys, the user can set forth input commands by connecting keys that represent letters that are desirably selected by the user. In such an embodiment, the feedback component 116 can cause the actuator 118 to provide haptic feedback while the user is setting forth input gestures to assist the user in understanding where the digit 106 is being swiped relative to keys in the soft input panel 202. For example, as indicated above, the user can initially localize the digit 106 relative to a graphical object, such that the user can locate the key 214 without having to look at the touch-sensitive display 102. Thereafter, the user can set forth the toggle command, indicating to the system 200 that subsequent gestures are to be interpreted as input gestures. The user may then employ shapewriting to set forth text. Again, if the user wishes to generate the text "hello," the user can cause the digit 106 to transition over the touch-sensitive display 102 from the key 214 (which represents the letter "h") to the key 204 (which represents the letter "e"). As the digit 106 transitions between such keys, the feedback component 116 can cause the actuator 118 to provide haptic feedback as the digit 106 transitions over borders between keys. Additionally, the feedback component 116 can cause the speaker 120 to output an audible signal that is indicative of keys over which the digit 106 is transitioning, direction of transition of the digit, velocity of transition of the digit, acceleration of transition of the digit, or the like. This feedback can assist the user in developing and using muscle memory to generate text using the soft input panel 202. For example, providing haptic feedback (and optionally audible feedback) as the user interacts with the touch-sensitive display may assist the user in remembering what it feels (and optionally sounds) like to set forth input data that causes the word "hello" to be generated (e.g., transitioning from the key 214 to the key 204, from the key 204 to the key 216, and from the key 216 to the key 208, thereby allowing the user to input the word "hello" without having to look at the touch-sensitive display 102).

Furthermore, the feedback component 116 can cause the actuator 118 to provide haptic feedback to confirm to the user that an input gesture has been appropriately interpreted or to inform the user that the input gesture is not recognized. For instance, if the user is employing shapewriting to set forth a relatively long word, and the application 105 has determined that the desired word is the only possible word that can be set forth by the user, even though the user has not completed the sequence of strokes necessary to entirely defined such word, the feedback component 116 can cause the actuator 118 to output haptic feedback to inform the user that the decoding has been completed. For example, the feedback component 116 can cause the actuator 118 to vibrate the phone. Alternatively, the feedback component 116 can cause the speaker 120 to output an audible signal to indicate to the user that the input gesture has resulted in completion of a word. Similarly, if the input gesture is not recognized, the feedback component 116 can cause the actuator 118 to provide haptic feedback to the user, thereby informing the user that the input gesture should be re-performed.

Figure 3:
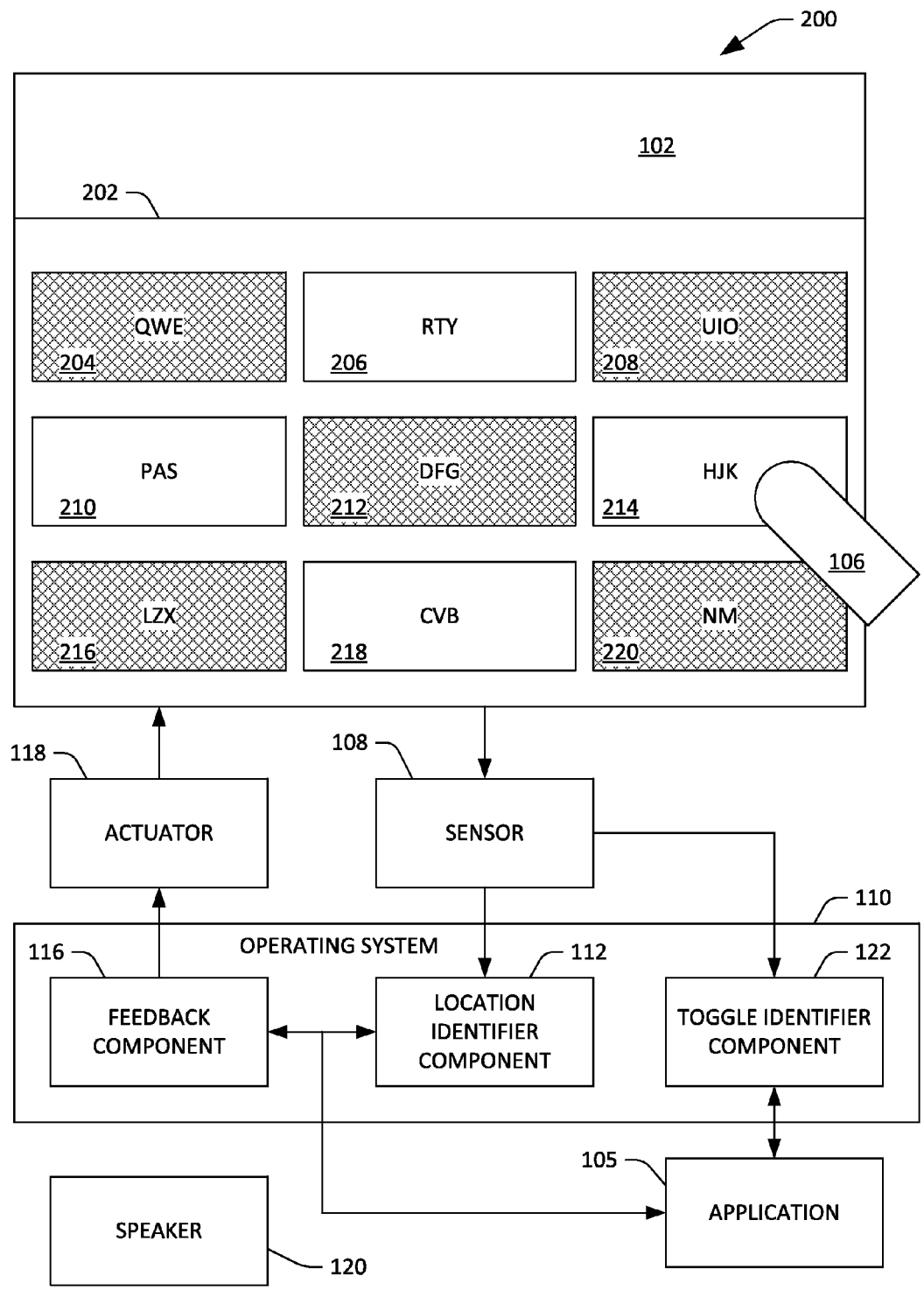
FIG. 3 is a functional block diagram of an exemplary system that illustrates certain portions in a soft input panel where haptic feedback is provided when a digit of the user transitions over such portions.

Now referring to FIG. 3, another exemplary depiction of the system 200, wherein haptic feedback is provided in a checkerboard pattern on keys in the soft input panel 202, is illustrated. In the example shown in FIG. 3, the feedback component 116 causes the actuator 118 to provide haptic feedback relative to the keys 204-220 in the soft input panel 202 in a checkerboard pattern. Therefore, for instance, when the location identifier component 112 determines that the digit 106 is in contact with the touch-sensitive display 102 on the key 204, the key 208, the key 212, the key 216, or the key 220, the feedback component 116 can cause the actuator 118 to provide haptic feedback, causing the user to perceive that such keys have a rougher surface when compared to the keys 206, 210, 214, or 218 when the digit 106 transitions over such keys. Thus, every other key in the soft input panel 202, both vertically and horizontally, is associated with provision of haptic feedback.

The exemplary scenario where the user desirably wishes to generate the text "hello" is again presented for purposes of explanation. The user first desirably positions the digit 106 at a location on the touch-sensitive display where the key 214 is displayed. In an example, the user can initially place the digit 106 at a bottom right-hand corner of the touch-sensitive display 102. The user may then begin transitioning the digit 106 upwardly and slightly to the left. When the digit 106 is transitioning over the touch-sensitive display 102 where the key 220 is displayed, the user perceives a higher amount of friction compared to when the digit 106 is transitioning over the touch-sensitive display where keys that are not associated with haptic feedback are displayed. When the digit 106 has completed the transition over the key 220, haptic feedback is ceased, and the user will perceive that the surface of the touch-sensitive display 102 is smooth, thus indicating to the user that the digit 106 rests upon the key 214. Therefore, the user can confidently localize the digit 106 relative to the key 214 without having to look at the touch-sensitive display 102.

As described above, the user may then set forth a toggle command, which is recognized by the toggle identifier component 122, causing subsequent gestures to be perceived as input gestures. While FIG. 2 and FIG. 3 depict exemplary manners of providing haptic feedback with respect to the soft input panel 202 (e.g., at borders, over keys, etc.), the hereto-appended claims are not to be limited by what is shown in such figures. For instance, in some cases, it may be desirable to provide gradual alterations in haptic feedback. Thus, for example, it may be desirable to provide no haptic feedback when the digit 106 is at the right-hand side of the screen and increasing amounts of haptic feedback as the digit 106 transitions further to the left hand side of the screen. Moreover, a user of the computing device can define locations in a graphical user interface where haptic feedback is desirably received. Thus, locations of a graphical user interface where haptic feedback is received can be customized by the user in a manner that the user believes will most greatly assist the user with respect to localizing the digit 106 or setting for input gestures.

Furthermore, different haptic feedback may be provided during localization than what is provided when setting forth input gestures. For instance, during localization of the digit 106 relative to a graphical object, haptic feedback may be provided at respective borders between the keys 204-220, as shown in FIG. 2, and when the user is setting forth input gestures, haptic feedback can be provided as displayed in FIG. 3, in accordance with the checkerboard pattern. In still other embodiments, haptic feedback can be provided, for instance, only at centers of the keys 204-220.

Figure 4:
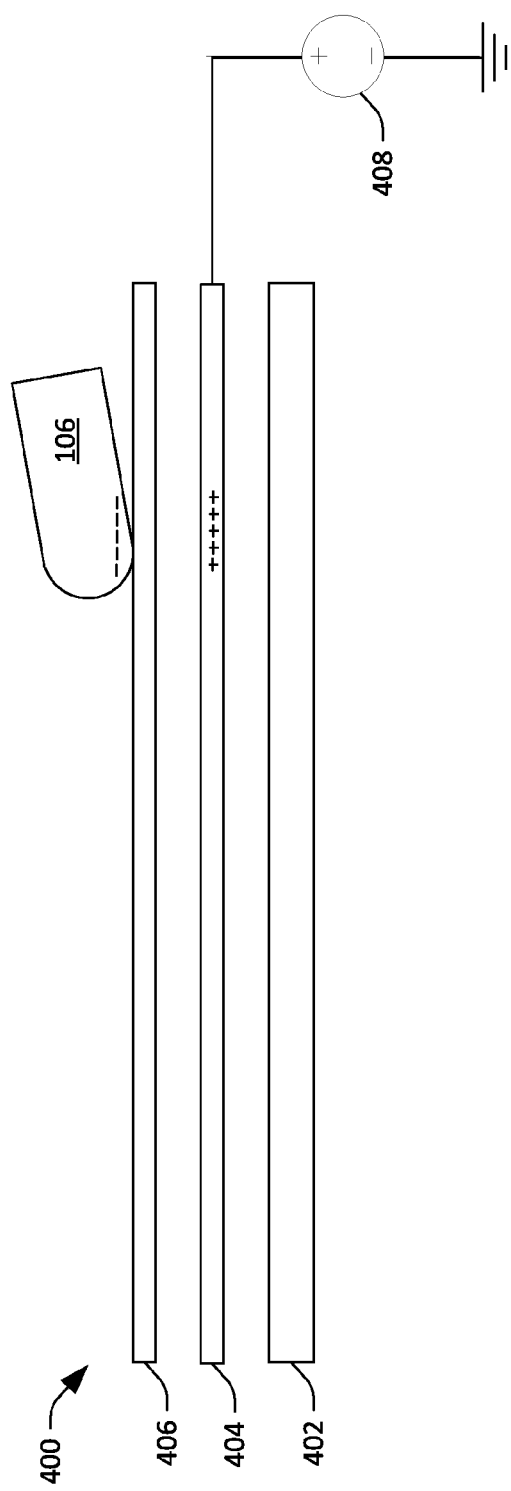
FIG. 4 illustrates hardware that can be employed in connection with causing a user to perceive changes in friction as the user interacts with a touch-sensitive display.

Referring now to FIG. 4, an exemplary touch-sensitive display 400 is illustrated. The touch-sensitive display 400 comprises a plurality of layers. The exemplary touch-sensitive display 400 provides a mechanism that can be employed in connection with modulating surface friction of a smooth surface, such as glass. The touch-sensitive display 400 comprises a glass layer 402. A transparent conducting layer 404 is placed adjacent to the glass layer 402, wherein, for example, the transparent conducting layer 404 may be indium tin oxide (ITO) or other suitable transparent conducting layer. The touch-sensitive display 400 may also comprise an insulating layer 406 positioned adjacent to the transparent conducting layer 404, such that the transparent conducting layer 402 is between the glass layer 402 and the insulating layer 406.

A voltage source 408 is configured to provide an appropriate amount of voltage to the conducting layer 404. When the digit 106 is in contact with the insulator layer 406, and electric current is provided to the conducting layer 404 via the voltage source 408, such electric current induces charges in the digit 106 opposite to the charges induced in the conducting layer 404. As shown in FIG. 4, inducement of a positive charge in the conducting layer 404 is caused when electric current is provided to the conducting layer 404. When the digit 106 is placed in contact with the insulator layer 406, a negative charge inside the skin of the digit 106 is induced.

The friction force f is proportional to μ (the friction coefficient of the glass surface) and the sum of $F_f$ (normal force the digit 106 exerts on the surface when pressing down) and $F_e$ (electric force due to the capacitive effect between the digit 106 and the conducting layer 404) as follows:

$$f=\mu(F_f+F_e) \quad (1)$$

As the strength of the current received at the conducting layer 404 changes, changes in f result. The user can sense the change in f, but not the change in $F_e$ (as the force is below the human perception threshold). Accordingly, the user subconsciously attributes changes in f to μ, causing the illusion that roughness of an otherwise smooth glass surface changes as a function of a position of the digit 106 on the touch-sensitive display 102. Thus, the user can perceive, at certain programmed locations, changes in friction.

Figure 5:
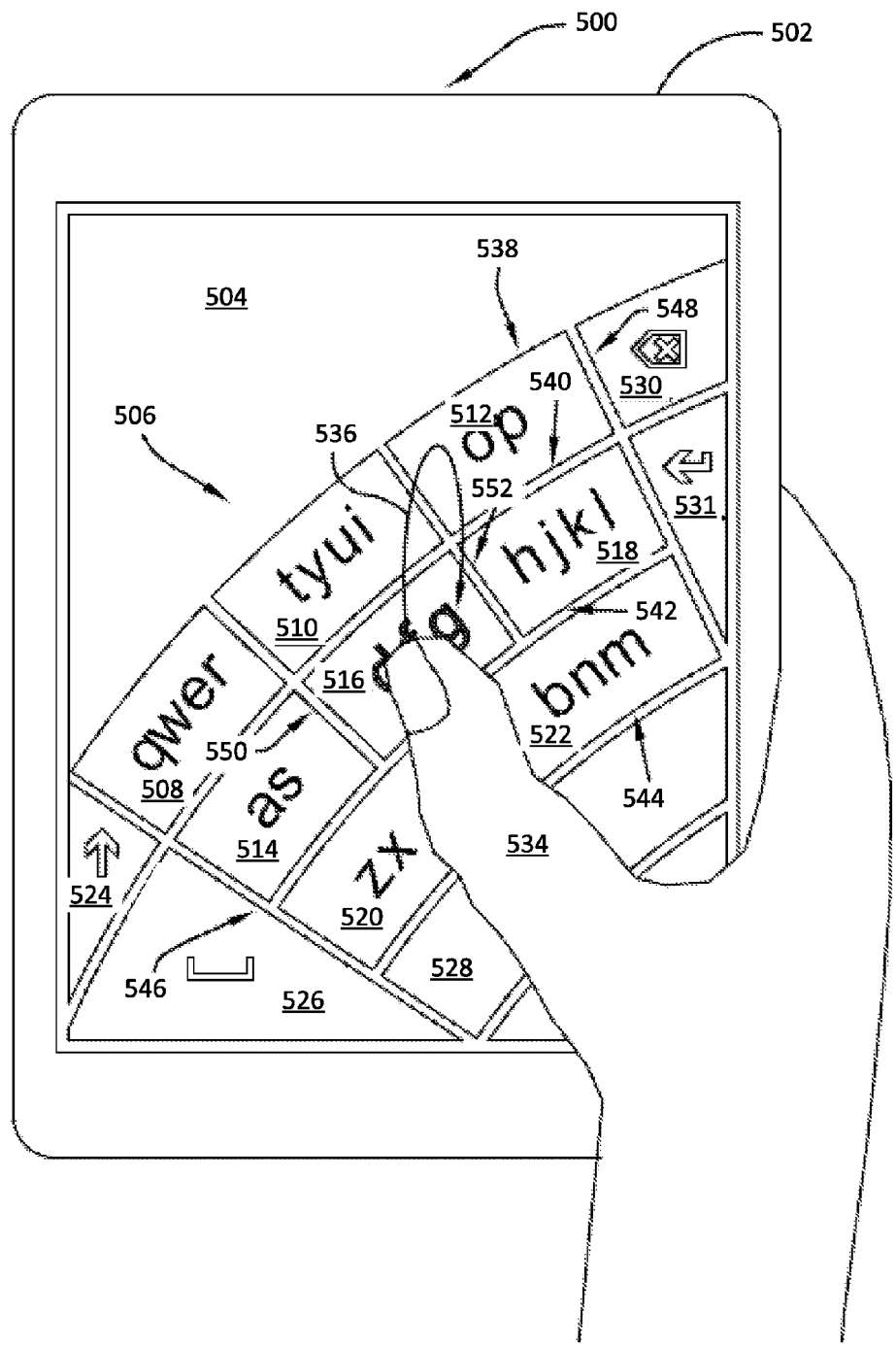
FIG. 5 illustrates an exemplary layout of keys in a soft input panel that a user can employ to generate text.

With reference now to FIG. 5, an exemplary mobile computing device 500 is illustrated. The mobile computing device 500 may be any suitable type of mobile computing device. The mobile computing device 500 comprises a housing 502, which can house hardware of the mobile computing device 500. The mobile computing device 500 further includes a touch-sensitive display 504 positioned in an aperture of the housing 502. The touch-sensitive display 504 is shown as displaying a soft input panel 506, which comprises a plurality of character keys 508-522, wherein each key in the character keys 508-522 is representative of a respective plurality of characters.

The soft input panel 506 further comprises a mode key 524, wherein selection of the mode key 524 can cause characters in the character keys 508-520 to be presented as capital letters in the soft input panel 506. The soft input panel 506 further comprises a space key 526, wherein selection of the space key 526 places a space between characters. A language key 528 can cause a language of characters or a dictionary of terms to be altered when selected. For example, selection of the language key 528 can cause language of the characters in the character keys 508-522 to change from English to Japanese, as well as cause an underlying dictionary or language model to alter from English to Japanese. Other languages are also contemplated. A backspace key 530, when selected by the user, causes a most recently entered character to be deleted, and an enter key 531, when selected by the user, can introduce a new line, initiate a particular action, or the like.

The soft input panel 506 is ergonomically arranged to map to the radial extent of a thumb 534 of a user of the mobile computing device 500 when the user is holding the mobile computing device 500 with one hand. Accordingly, the user can enter text using the soft input panel 506 using her thumb while gripping the mobile computing device 500. This facilitates entry of text using the soft input panel 506 without requiring the user to view the touch-sensitive display 504 when shapewriting using the soft input panel 506.

Other exemplary layouts that are ergonomically arranged to allow for input of text by way of the thumb 534 are set forth below. In the example shown in FIG. 5, the user may desire to enter the word "dog" using the soft input panel 506. To enter such word, the user can initially position her thumb 534 on the key 516, which represents the letter "d" (along with the letters "f" and "g"). The user may then transition the thumb 534 to the key 512, which represents the letter "o" (along with the letter "p"). Thereafter, the user can transition her thumb 534 over the soft input panel 506 back to the key 516, which represents the letter "g." This action is shown by trace 536, which is a continuous sequence of strokes from the key 516 to the key 512 and back to the key 516. When entering the word "dog," the thumb 534 of the user maintains contact with the touch-sensitive display 2504 (and thus, with the soft input panel 506 displayed thereon). When the user has completed the word, the user may lift her thumb 534 from the touch-sensitive display 504.

In the exemplary embodiment shown in FIG. 5, the soft input panel 506 includes a curved upper boundary 538. Position of the curved upper boundary 538 on the touch-sensitive display 504 may be based upon a swipe of the thumb 534 over the touch-sensitive display 504. For example, the curved upper boundary 538 can correspond to a maximum radial extent of the thumb 534 of the user when the user is holding the mobile computing device 500 with her right hand. The soft input panel 506 may also include a plurality of internal boundaries 540-544, wherein the internal boundaries 540-544 are concentric with the upper curved boundary 538 and each other. Boundaries 546 and 548 may define an exterior of the plurality of character keys 508-522, and may extend from a centroid of the curved boundaries 538-544. A plurality of internal boundaries 550 and 552 may further be configured to separate keys in the character keys 508-522.

As noted above, in an exemplary embodiment, the mobile computing device 500 can be configured to provide haptic feedback to the user when the thumb 534 of the user transitions over any of the boundaries 538-552 in the soft input panel 206. In the example, when the user is desiring to enter the word "dog," haptic feedback can be provided to the user when the thumb 534 transitions over the boundary 540. Further, haptic feedback can be provided as the thumb 534 of the user transitions over the boundary 552. Haptic feedback can also be provided to the user as the thumb 534 of the user transitions over the boundary 540, and further haptic feedback can be provided to the thumb 534 of the user when the thumb 534 transitions over the boundary 552 during the trace 536. In another exemplary embodiment, haptic feedback can be provided in a checkerboard pattern with respect to the character keys 508-522.

Figure 6:
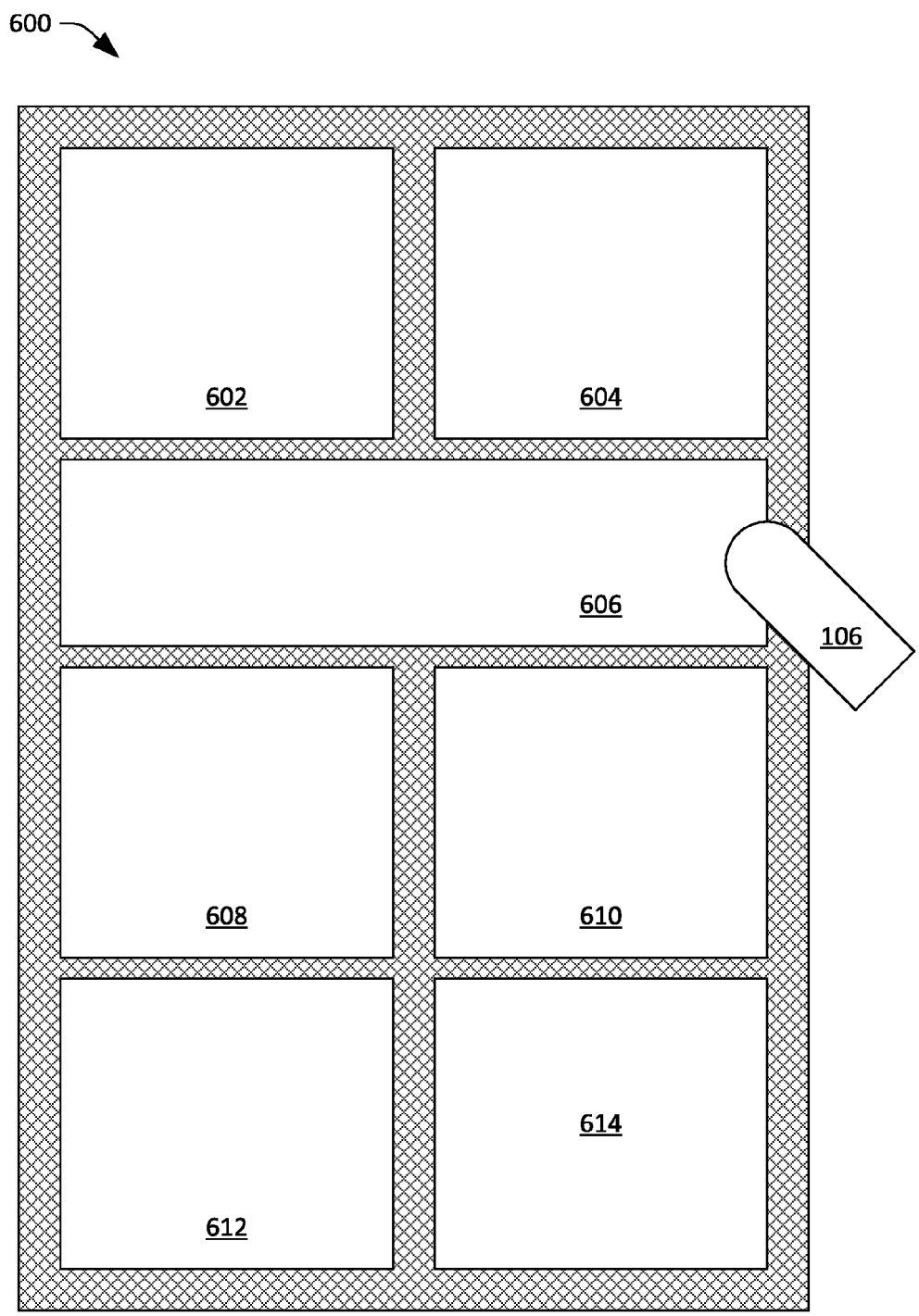
FIG. 6 illustrates an arrangement of a plurality of widgets, wherein haptic feedback is provided to the user as a digit of the user transitions over such widgets to assist the user in locating and interacting with the widgets.

Now referring to FIG. 6, an exemplary touch-sensitive display 600 that displays a plurality of selectable widgets 602-614 is illustrated. While size and location of the widgets 602 through 614 is shown in a particular manner, it is to be understood that the widgets may be arranged differently. For instance, the widgets may be smaller, may be separated by greater distance, etc.

In this example, each widget represents a respective application which can be initiated upon selection of the widget. Thus, for instance, the widget 602 can represent a web browser, wherein the web browser is initiated upon the user selecting the widget 602. In another example, the widget 604 can represent a telephone application, wherein selection of the widget 604 causes the telephone application to be initiated. In the example shown in FIG. 6, haptic feedback can be provided at borders between respective widgets. It is to be understood, however, that haptic feedback can be provided over an entirety of a widget, at centers of widgets, etc.

In the example presented in FIG. 6, the user may wish to select the widget 606, and thus initiate the application represented by the widget 606 without looking at the touch-sensitive display 600. The user can generally place the digit 106 near an upper right-hand corner of the touch-sensitive display 600 and begin transitioning the digit 106 downwardly. Again, when localizing the digit 106 relative to a graphical object, the swipe is not interpreted as an input gesture. As the user transitions the digit 106 downwardly, the user will initially perceive that the surface is somewhat rough (as the digit is transitioning over the shaded region above the widget 604). As the digit 106 reaches the location on the touch-sensitive display 600 where the widget 604 is displayed, haptic feedback is no longer provided to the user, and the user perceives that the touch-sensitive display is smooth at the location corresponding to the widget 604. When the digit 604 reaches the border between the widget 604 and 606, the user perceives that the surface of the touch-sensitive display is rough relative to when the digit 106 is positioned over the widget 604. When the digit 106 reaches the widget 606, the user perceives that the touch-sensitive display 600 is smooth. Therefore, if the user is generally aware of the layout of widgets, the user can ascertain that the digit 106 is on the widget 606 without having to look at the touch-sensitive display 600. Thereafter, the user can set forth the toggle command described above, and can utilize an input gesture (a tap) to select the widget 606, and thus initiate the application represented by such widget 606.

Figure 7:
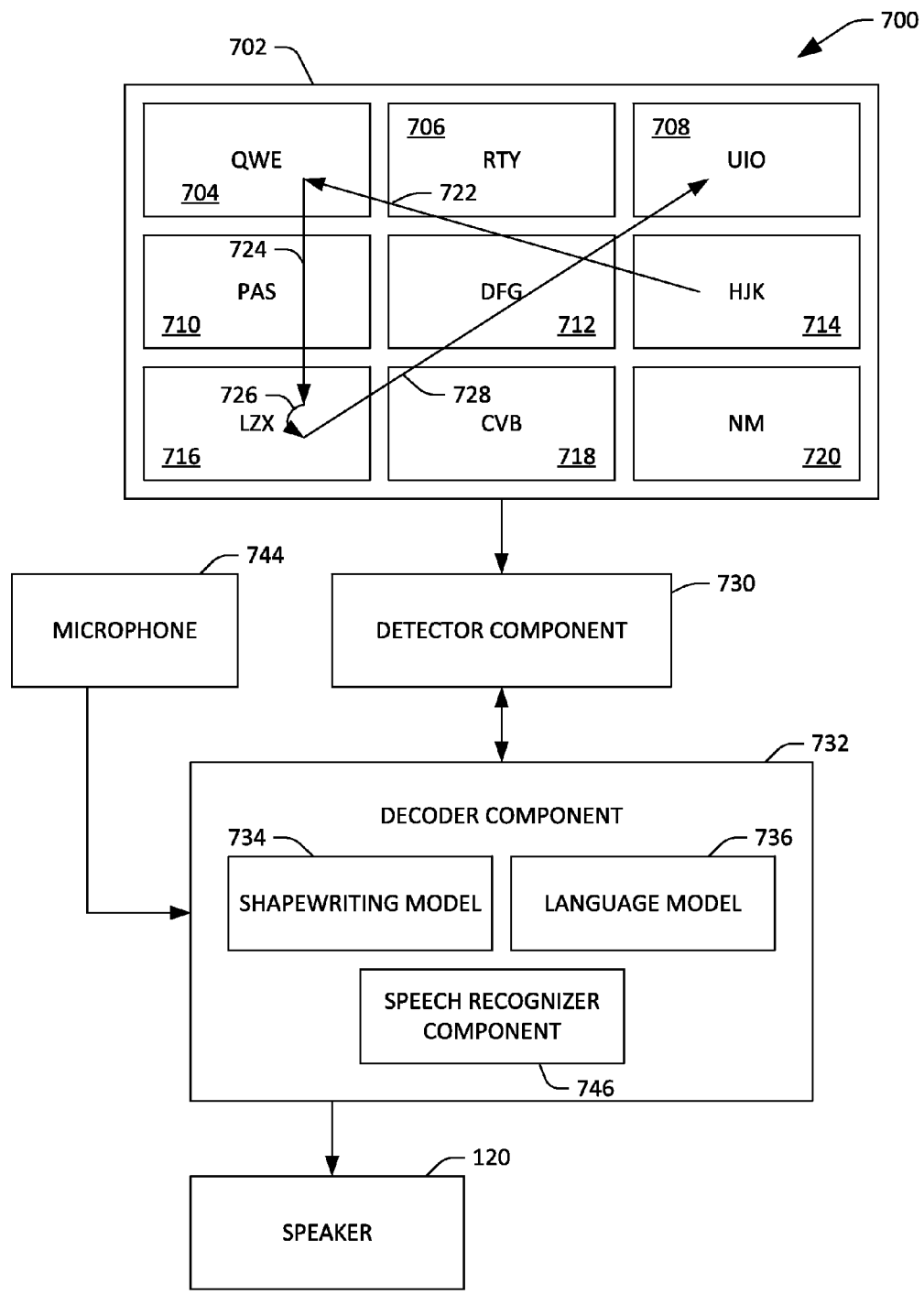
FIG. 7 is a functional block diagram of an exemplary system that facilitates generating text through use of shapewriting.

Referring now to FIG. 7, an exemplary system 700 that facilitates decoding text input by way of shapewriting is illustrated. Pursuant to an example, a computing device, such as a mobile computing device, can comprise the system 700 as well as the system 100 shown in FIG. 1. The system 700 comprises a soft input panel 702.

The soft input panel 702 comprises a plurality of keys 704-720. In the embodiment shown in FIG. 7, each of the keys 704-720 is a respective character key, in that each key is representative of a respective plurality of characters. The soft input panel 702 may also include additional keys, such as an "enter" key, a space bar key, numerical keys, and other keys found on conventional keyboards.

Again, as shown, each of the keys 704-720 in the soft input panel 702 is representative of a respective plurality of characters. For example, the key 704 is representative of the characters "Q," "W," and "E," the key 706 is representative of the characters "R," "T," and "Y," etc. In other embodiments, characters can be arranged in alphabetical order or some other suitable arrangement.

In an exemplary embodiment, the soft input panel 702 is configured to receive input from a digit of a user by way of shapewriting (e.g., a continuous sequence of strokes over the soft input panel 702). A stroke, as the term is used herein, is the transition of a digit (e.g., a thumb) of the user from a first key in the plurality of keys 704-720 to a second key in the plurality of keys 704-720 while the digit maintains contact with the soft input panel 702. A continuous sequence of strokes then, is a sequence of such strokes, where the digit of the user maintains contact with the soft input panel 702 throughout the sequence of strokes. In other words, rather than the user tapping discrete keys on the soft input panel 702, the user can employ the digit (or a stylus or pen) to connect keys that are representative of respective letters in a desired word. A sequence of strokes 722-728 illustrates employment of shapewriting to set forth the word "hello." While the sequence of strokes 722-728 is shown as being discrete strokes, it is to be understood that, in practice, a trace of the digit of the user over the soft input panel 702 may appear as a continuous, curved shape with no readily ascertainable differentiation between strokes.

The system further 700 comprises a detector component 730 that detects strokes set forth by the user over the soft input panel 702. Therefore, for example, the detector component 730 can detect the sequence of strokes 722-728, wherein the user transitions her digit from the key 714 to the key 704, followed by transition of her digit to the key 716, followed by her transition of her digit to the key 708.

A decoder component 732 is in communication with the detector component 730 and decodes the sequence of strokes 722-728 set forth by the user of the soft input panel 702, such that the decoder component 732 determines a sequence of characters (e.g., a word) desirably set forth by such user. Pursuant to an example, the decoder component 732 can receive a signal from the detector component 730 that is indicative of the sequence of strokes 722-728 set forth by the user over soft input panel 702, and can decode such sequence of strokes 722-728 and output the word "hello." As each of the keys 704-720 is representative of a respective plurality of characters, the decoder component 732 can disambiguate between potential words that can be constructed based upon the strokes set forth by the user (e.g., based upon characters in respective keys over which a trace of the digit has passed or to which the trace of the digit is proximate). Still further, the decoder component 732 can be configured to correct for possible spelling errors entered by the user, as well as errors in position of the digit of the user over the keys 704-720 in the soft input panel 702. As noted above, the soft input panel 702 may be particularly well-suited for eyes-free entry of text by the user of the soft input panel 702. Therefore, when the user is interacting with the soft input panel 702, her digit may not be positioned precisely over respective keys that are desirably selected by the user.

In connection with performing such decoding, the decoder component 734 can comprise a shapewriting model 734 that is trained using labeled words and corresponding traces over soft input panels set forth by users. With more particularity, during a data collection/model training phase, a user can be instructed to set forth a trace (e.g., continuous sequence of strokes) over a soft input panel for a prescribed word. Position of such trace can be assigned to the word, and such operation can be repeated for multiple different users and multiple different words. As can be recognized, variances can be learned or applied to traces for certain words, such that the resultant shape writing model 734 can relatively accurately model sequences of strokes for a variety of different words in a predefined dictionary. Moreover, if the operation is repeated for sufficiently many differing words, the shape writing model 734 can generalize to new words, relatively accurately modeling sequences of strokes for words that are not in the predefined dictionary but have similar patterns of characters.

Furthermore, the decoder component 732 can optionally include a language model 736 for a particular language, such as English, Japanese, German, or the like. The language model 736 can be employed to probabilistically disambiguate between potential words based upon previous words set forth by the user.

The system 700 may further optionally include the speaker 120 that can audibly output a word or sequence of words decoded by the decoder component 732 based upon sequences of strokes detected by the detector component 730. In an exemplary embodiment, the speaker 120 can audibly output the word "hello" in response to the user performing the sequence of strokes 722-728 over the soft input panel 702. Accordingly, the user need not look at the soft input panel 702 to receive confirmation that the word desirably entered by the user has been accurately decoded. Alternatively, if the decoder component 732 incorrectly decodes a word based upon the sequence of strokes 722-728 detected by the detector component 730, the user can receive audible feedback that informs the user of the incorrect decoding of the word. For instance, if the decoder component 732 decodes the word desirably set forth by the user as being "orange," then the user can quickly ascertain that the decoder component 732 has incorrectly decoded the word desirably set forth by the user. The user may then press some button (not shown) that causes the decoder component 732 to output a next most probable word, which can be audibly output by the speaker 120. Such process can continue until the user hears the word desirably entered by such user. In other embodiments, the user, by way of a gesture or voice command, can indicate a desire to re-perform the sequence of strokes 722-728 such that the previously decoded word is deleted. In still another example, the decoder component 732 can decode a word prior to the sequence of strokes being completed, and display such word prior to the sequence of strokes being completed. For instance, as the user sets forth a sequence of strokes, a plurality of potential words can be displayed to the user.

Furthermore, it can be recognized that the decoder component 732 can employ active learning to update the shapewriting model 734 or the language model 736 based upon feedback set forth by the user of the soft input panel 702 when setting forth sequences of strokes. That is, the shapewriting model 734 can be refined based upon size of the digit of the user used to set forth the trace over the soft input panel 702, shape of traces set forth by the user over the soft input panel 702, etc. Similarly, the dictionary utilized by the shapewriting model 734 or the language model 736 can be updated based upon words frequently employed by the user of the soft input panel 702 or an application being executed. For example, if the user desires to set forth a name of a person that is not included in the dictionary of the shapewriting model 734, the user can inform the decoder component 732 of the name such that subsequent sequences of strokes corresponding to such name can be recognized and decoded by the decoder component 732. In another example, a dictionary can be customized based upon an application for which text is being generated; for instance, words/sequences of characters set forth by the user when employing a text messaging application may be different from words/sequences of characters set forth by the user when employing an email or word processing application.

The system 700 may optionally include a microphone 744 that can receive voice input from the user. The user, as noted above, can set forth a voice indication that the decoder component 732 has improperly decoded a sequence of strokes, and the microphone 744 can receive such voice indication. In another exemplary embodiment, the decoder component 732 can optionally include a speech recognizer component 746 that is configured to receive spoken utterances of the user and recognize words therein. In an exemplary embodiment, the user can verbally output words that are also entered by way of a trace over the soft input panel 702, such that the spoken words supplement the sequence of strokes and vice versa. Thus, for example, the shapewriting model 734 can receive an indication of a most probable word output by the speech recognizer component 746 (where the spoken word was initially received from the microphone 744) and can utilize such output to further assist in decoding a trace set forth over the soft input panel 702. In another embodiment, the speech recognizer component 746 can receive a most probable word output by the shapewriting model 734 based upon a trace detected by the detector component 730, and can utilize such output as a feature for decoding the spoken word. The utilization of the speech recognizer component 746, the shapewriting model 734, and the language model 736, can enhance accuracy of decoding.

Figure 8:
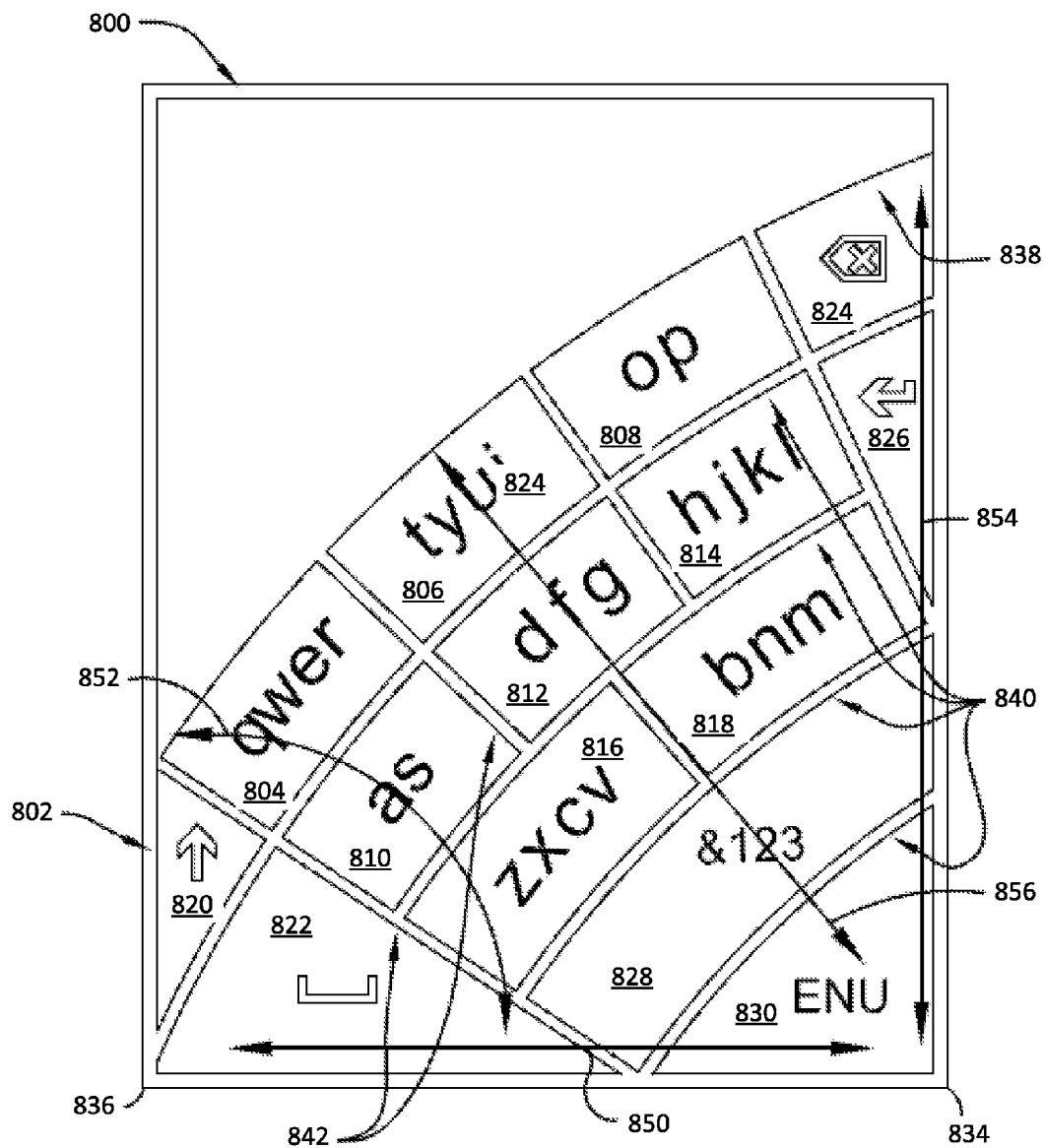
FIGS. 8-13 illustrate exemplary layouts of keys in exemplary soft input panels.

FIG. 8 shows an exemplary touchscreen 800 for a computing device, such as a tablet or mobile phone. The touchscreen 800 comprises a soft input panel (SIP) 802 that allows a user to select text characters and enter other commands, such as "enter" and "backspace," by touching or tracing over the different regions of the touchscreen 800. The SIP 802 can be used for many different tasks, such as writing text messages or emails, entering data on a website, performing a global search, etc.

The SIP 802 comprises a plurality of keys 804-830. Each of the keys can be used to perform a different command by touching the key. Exemplary commands can include entering a text character, backspacing, shifting to a different set of keys, etc.

The SIP 802 can be configured to be used by a person holding a computing device with one hand. For example, a user can grip a mobile computing device with his right hand at the bottom right corner and use his right thumb to touch or trace over the various keys of the SIP 802, or grip a mobile computing device with his left hand at the bottom left corner and use his left thumb to touch the various keys of the SIP 802. Each of the SIP embodiments described herein can be configured to be used by a person holding the computing device with one hand and using the thumb of that hand to touch the keys of the SIP. While the exemplary SIPs shown in FIGS. 8-13 are configured for use by a person holding the computing device with his right hand, other embodiments not shown can be configured for use with the left hand in a similar manner. The keys of a right-handed SIP (e.g., those shown in FIGS. 8-13) can be clustered near the bottom right corner of the touchscreen. For example, the keys of the SIP 802 in FIG. 8 are clustered near the bottom right corner 834 of the touchscreen 800. Similarly, the keys of a left-handed SIP can be clustered near the bottom left corner (e.g., 836) of the touchscreen. Clustering the keys near a corner of the touchscreen can make it easier for a user to reach the keys with her thumb.

The keys of a SIP can be rectangular, triangular, have other polygonal shapes, and/or can have shapes at least partially defined by non-linear boundaries. For example, the keys of the SIP 802 can be partly defined by a plurality of curved or arcuate boundaries, including a curved upper boundary 838 and curved intermediate boundaries 840, partly defined by a plurality of linear boundaries, some of which are labeled 842, and/or partly defined by the linear edges of the touchscreen 800. For example, the key 820 is defined by the left edge of the touchscreen 800, one of the linear boundaries 842, and one of the curved boundaries 840. In some embodiments, the keys can also have rounded corners.

A user's thumb anatomically pivots in an arc motion that is generally centered at a point adjacent her wrist. The keys of a SIP can therefore be arranged in a corresponding arced pattern to allow the user to more naturally move her thumb over different keys. The SIP 802 can comprise curved boundaries between the keys that have a center of curvature located approximately where a user's thumb would pivot about her wrist. For example, in the SIP 802, the curved boundaries 838 and 840 can have one or more centers of curvature below and/or to the right of the bottom right corner 834 of the touchscreen 800. The center(s) of curvature of the curved boundaries 838 and 840 can be located, for example, at or near the bottom right corner of the computing device, or farther away from the touchscreen 800, such as below and to the right of the bottom right corner of the computing device, such as where a user's thumb-wrist joint would be located when holding the computing device in the right hand. In some embodiments, one or more of the curved boundaries 838-840 can be concentric.

In some embodiments, one of the curved boundaries can intersect with the opposite bottom corner of the touchscreen. For example, one of the boundaries 840 intersects with the bottom left corner 836 in FIG. 8. The number of curved boundaries in a SIP can vary, such as from one to 5 or more. In some embodiments, the curved boundaries can be equally spaced apart radially, such that the keys defined between the curved boundaries have an equal radial height (as measured from the center of curvature of the curved boundaries).

Some of the keys of a SIP can be larger or smaller than other keys. For example, some of the keys can have a greater area than other keys. For instance, the key 828 in FIG. 8 has a greater area than many of the other keys. Some of the keys can be wider or longer than other keys. For example, the key 828 is longer than the keys 816 and 818, and those keys are longer than the keys 810, 812 and 814. The size of a key can make it easier for a user to locate and touch that key (e.g., locate and trace over the key). More commonly used keys can be made larger in area in some SIPs. For example, the space bar key 822 can be larger than many other keys because the spacebar key is very commonly used. Other, less commonly used keys can be made smaller.

The location of a key on the SIP 802 can also make that key easier or more difficult to reach. For example, the alpha keys (804-818) of the SIP 802 can be clustered in the center of the SIP 802 to make them more readily reachable. Other commonly used keys, such as the backspace key 824, can be located to the side of the letter keys where they are also readily accessible by the user's thumb since they are also positioned along the natural arc path made by the thumb. On the other hand, lesser used keys, such as the language key 830 (labeled "ENU") can be positioned near the bottom/inner corner of the SIP 802 (e.g., near the bottom right corner 834 in FIG. 8) or other fringes of the SIP 802 where it is more difficult to reach. Positioning the keys in a manner similar to a common QWERTY keyboard can also make it easier and faster for a user to locate the keys. For example, the backspace key 824 and return key 826 can be located on the right hand side of the SIP 802, like they are on a QWERTY keyboard, to make locating those keys more intuitive for a user.

A user can have a limited range when using his thumb to touch the keys of a SIP. The thumb range may be limited radially, such as by a maximum radial reach and/or by a minimum radial reach. Depending on the user's anatomy, the way she holds the device, and the size of the device, the maximum and/or minimum radial reach limits of her thumb can vary. The maximum radial boundary of the SIP 802 can be positioned to correspond to the maximum reach limit of the user's thumb. The maximum radial boundary can comprise a curved upper boundary of the SIP, such as the upper boundary 838.

In some cases, a user can bend his thumb inward far enough to reach the bottom corner of the touchscreen 800 near the ball of the thumb, while in other cases there can be a region of the touchscreen 800 adjacent the bottom corner near the ball of the thumb that the user cannot easily reach with his thumb, such as with user's having relatively large thumbs. Thus, in some embodiments, an area of the touchscreen 800 near that bottom corner can be left open or empty and not be part of the SIP 802. The radial limits of the SIP 802 can be set or adjusted by the user swiping his thumb radially in a full range of motion, which can be done to initially invoke or open the SIP 802, for example.

In some embodiments, the SIP 802 can extend angularly (perpendicular to the radial direction) about a 90° angle from one side of the touchscreen to the bottom of the touchscreen, as shown in FIGS. 8-13. In some embodiments, the SIP 802 can also partially border the opposite side edge, as shown in FIGS. 8-13. For instance, in FIG. 8, keys 820 and 822 can appear to intersect with the leftward edge of the touchscreen 800. In other embodiments, the SIP 802 can extend angularly about an angle of less than 90°, such as between 45° and 90°. For example, in some cases a user's thumb can have a limited angular mobility such that it cannot readily be pivoted a full 90° from the side edge of the touchscreen 800 to the bottom edge of the touchscreen 800. Thus, the touchscreen 800, in some embodiments, can have open or non-functional areas near the side edge and/or near the bottom edge that are not part of the SIP 802 and/or do not have any of the keys of the SIP 802. In some embodiments, these non-key regions of the SIP 802 or touchscreen 800 can be used for display purposes instead of input purposes.

In some embodiments, the SIP 802 can be switched between a right handed configuration and a left handed configuration. Thus, if a user switches hands, the SIP 802 can be configured to switch to the opposite bottom corner of the touchscreen 800. In some embodiments, the mobile device can sense which hand the user is holding the device in. For example, the mobile device can comprise gyroscopic sensors, pressure sensors, and/or other types of sensors that can be used to determine which hand the user is holding the device with. In other embodiments, the user can provide an input to cause the SIP 802 to switch sides. For example, the user can press a key in the SIP 802 that can cause the SIP 802 to switch sides or set forth a voice command that causes the SIP 802 to switch sides. In some embodiments, the user can slide her thumb (or any other finger or stylus) laterally across the bottom of the touchscreen (e.g., in the directions of arrow 850 in FIG. 8) to cause the SIP 802 to switch sides. For example, if the SIP 802 is at the bottom right corner 834, the user can slide her thumb from right to left across the bottom of the touchscreen to cause the SIP 802 to switch to the bottom left corner 836. In some embodiments, the user can swipe her thumb in an arc motion about a bottom corner of the touchscreen (e.g., in the directions of arrow 852 in FIG. 8) to cause the SIP 802 to switch to that corner. Various other sensory or user input means can also be used to cause the SIP 802 to switch to a different corner of the touchscreen 800.

The radial and/or angular size of the SIP 802 can also be adjusted. In some embodiments, the radial size of the SIP 802 can be adjusted by swiping the thumb radially from near the bottom corner of the SIP 802 (e.g., in the outward direction of arrow 854 or arrow 856 in FIG. 8). The touchscreen 800 can sense the maximum extent of the user's thumb reach from the radial thumb swipe and the radial size of the SIP 802 can be set or adjusted in response to the swipe and/or based on the user's thumb reach. In some embodiments, the minimum reach of the user's thumb can also be determined from a radial thumb swipe. Thus, the radial boundaries of the SIP 802 can be set or adjusted based on the start and end of the user's radial swipe. In some cases, the user can input a plurality of radial swipes and the average, maximum, minimum, or other function of those swipes can be used to set the radial boundaries of the SIP 802. In some embodiments, the radial boundaries of the SIP 802 can be set or adjusted based on one or more arcuate angular swipes made by the user. For example, a user can input a plurality of arcuate angular swipes at different radial positions to provide a range of reach for the user's thumb. In some embodiments, a user can customize the radial boundaries of the SIP 802 in other manners, such as entering coordinates or dimensions, selecting from pre-set configurations, etc.

Similarly, the angular boundaries of the SIP 802 can be adjusted based on user input. In some embodiments, the angular boundaries of the SIP 802 can be adjusted by swiping angularly in an arc, such as in the directions of arrow 852 in FIG. 8 (or in the opposite direction). The touchscreen 800 can sense the maximum extent of the user's angular thumb reach from one or more swipes and the angular boundaries of the SIP 802 can be set according to the ends of the swipe(s) or some other function of the swipe(s). In some embodiments, a user can customize the angular boundaries of the SIP 802 in other manners, such as entering coordinates or dimensions, selecting from pre-set configurations, etc.

In some embodiments, a user can close or put away the SIP 802 by swiping radially or vertically from near the top of the SIP 802 downward or toward a corner (e.g., in the inward direction of the arrow 854 or the arrow 856 in FIG. 8). Similarly, a user can re-open or bring back up the SIP 802 by swiping vertically or radially from a corner. Such a swipe to re-open the SIP 802 can at the same time be used to measure the thumb reach of the user to size the SIP 802.

In some embodiments, various gestures or other actions can be used to manipulate the SIP 802. Swiping across the touchscreen 800 is one example of such a gesture. Other examples can include double tapping certain keys or region, pinching motions using two fingers, spreading two fingers apart across the touchscreen 800, etc. For example, in some embodiments, double tapping the spacebar key can insert a period.

Flicking or swiping with a finger can provide various functions, as described herein. In some embodiments, flicking or swiping actions can be performed before, after, or during text entry, such as to open or close the SIP 802, to resize the SIP 802, or to switch the SIP 802 to the opposite side or bottom corner.

In some embodiments, the SIP 802 can comprise one key for each letter of the alphabet. In other embodiments, the SIP can include one or more keys that can be used to enter more than one letter, such as in the embodiments shown in FIGS. 8-13. Because the SIP 802 is limited in area by the reach of the user's thumb, space is limited and there may not be enough room to have one key for every letter and keys for other important functions like return, space, shift, etc. Thus, by grouping plural letters on some of the keys, fewer keys are needed and the each key can be made larger so they are easier to locate touch without accidentally touching the adjacent keys.

When a user traces over keys used for plural letters, such as the key 804 in FIG. 8, a disambiguation program/process can be used to determine which letters/words the user intends to enter. For example, the device can analyze plural keys traced over in sequence to determine possible words that the user may be trying to spell. If multiple possible words are determined, the various options can be output (e.g., audibly) to the user for selection (sometimes referred to as Input Method Editor candidates) and/or the device can select one of the words for the user, such as the most commonly typed word or a word that fits grammatically.

In the SIP 802 in FIG. 8, different keys have different numbers of letters associated with them. The keys 804, 806, 814, and 816 each are associated with four letters, the keys 812 and 818 are associated with three letters, and the keys 808 and 810 are associated with two letters. Generally, less commonly used letters, such as "Q" and "Z" can be grouped with more other letters, while more commonly used letters, such as "A" and "O" can be grouped with fewer other letters. In some embodiments, the letters can be grouped such that the various different keys are used more equally in text entry.

With more particularity, the SIP 802 comprises three rows of alphabetic keys, wherein each row includes multiple keys, and each key (or at least a plurality of the keys) represents respective multiple alphabetical characters. The alphabetical characters, in an exemplary embodiment, are arranged in accordance with the QWERTY standard. A first row of keys includes keys 804, 806, and 808, a second row of keys includes keys 810, 812, and 814, and a third row of keys includes keys 816 and 818. As shown, the first row of keys may be the row positioned furthest from the corner 834 (or corner 836) from amongst all rows, the second row of keys may be positioned adjacent to the first row and closer to the corner 834 (or corner 836), and the third row of keys may be positioned adjacent to the second row and still closer to the corner 834 (or corner 836) when compared to position of the first row and the second row. Thus, it can be ascertained that at least one row of keys in the SIP 802 that represent alphabetical characters is composed of two keys, while at least one other row of keys in the SIP 802 that represent alphabetical characters is composed of at least three keys.

Causing the third row of keys that are representative of multiple alphabetical characters to be composed of two keys can be undertaken to ease input of alphabetical characters through tracing over such keys by way of the thumb of the user. Further, utilizing eight keys (rather than nine) to represent all alphabetical characters can be found to have little detriment when disambiguating text entered by way of shapewriting over the SIP 802.

As shown, in the first row of keys, the key 804 can represent the alphabetical characters "Q," "W," "E," and "R," the key 806 can represent the alphabetical characters "T," "Y," "U," and "I," and the key 808 can represent the alphabetical characters "O" and "P." Thus, a key that represents four alphabetical characters can be positioned in a row of keys that represent alphabetical characters immediately adjacent to a key that represents two characters. In the second row of keys, the key 810 can represent the alphabetical characters "A" and "S," the key 812 can represent the alphabetical characters "D," "F," and "G," and the key 814 can represent the alphabetical characters "H," "J," "K," and "L." Therefore, a key that represents two alphabetical characters can be positioned in a row of keys that represent alphabetical characters immediately adjacent to a key that represents three alphabetical characters. Additionally, a key that represents three alphabetical characters can be positioned in a row of keys that represent alphabetical characters immediately adjacent to a key that represents four alphabetical characters. Finally, in the third row of keys, the key 816 can represent the characters "Z," "X," "C," and "V," and the key 818 can represent the characters "B," "N," and "M." Again, the third row of keys can include two keys, while the first and second row of keys can each include three keys.

In an exemplary embodiment, arrangement of keys and/or alphabetical characters represented by keys can be selected to substantially optimize the ability of the mobile device to disambiguate text desirably generated by the user through shapewriting over the SIP 802. For example, constraints pertaining to design of the SIP 802 can be set forth: exemplary constraints include a constraint on the sequence or relative layout of alphabetical characters to be represented by keys (e.g., to substantially conform to a QWERTY layout), a constraint that restricts character groupings to which a particular alphabetical character can belong (e.g., an alphabetical character can belong to an arbitrary number of character groups, except that the alphabetical character can only belong to neighboring groups from an initially prescribed group), amongst other constraints.

A dictionary of words that can be generated by way of the SIP 802 can be received, wherein words in the dictionary of words have, for instance, some indication of frequency/probability of use of such words corresponding thereto. Integer programming can be employed to locate groups of characters that satisfy imposed constraints, and an optimization function can be utilized to identify groupings of characters that allow for substantially optimal disambiguation. In an example, a word in the English language desirably entered by way of the SIP 802 can be "this"; first, the thumb of the user is positioned over the key 806 and then transitioned to the key 814, followed by transition of the thumb to the key 806, followed by transition of the thumb to the key 810. All possible candidate words that can be generated using such sequence of keys, with characters grouped as shown in FIG. 8, can be identified, sorted by probability or frequency of use in the English language. A score is then assigned based upon position of the desired word "this" in the candidate words. For instance, if the word "this" is first in the candidate words, a first, high score can be output, while if the word "this" is lower in the candidate words, a lower score (or zero score) can be output. This process can be undertaken for each word in a dictionary, for instance, and for each possible grouping of characters that conforms to the constraints. The grouping of characters with the highest score can be output as the desired grouping of characters. Such score can be a highest aggregate score across all words in the dictionary, potentially with words weighted as a function of frequency of use (popularity) of such words. For instance, the characters grouped as shown in the SIP 802 of FIG. 8 can be optimized for a certain dictionary and scoring function, given constraints of character sequence, maximum number of characters that can be represented by a single key, minimum number of characters that can be represented by a single key, amongst other constraints. In yet another embodiment, the groupings can be optimized based upon a dictionary of a user of the mobile device, as different users may have different vocabularies and use words with differing frequencies.

While integer programming is an exemplary technique for identifying groupings of characters in the SIP 802, it is to be understood that other techniques are contemplated. For example, genetic algorithms can be employed to learn an optimal layout for a certain dictionary of terms with known/assumed frequency/probability of user. Still further, while the SIP 802 illustrates English characters, it is to be understood that groupings of characters can be undertaken using characters of other language, such as Japanese.

Figure 9:
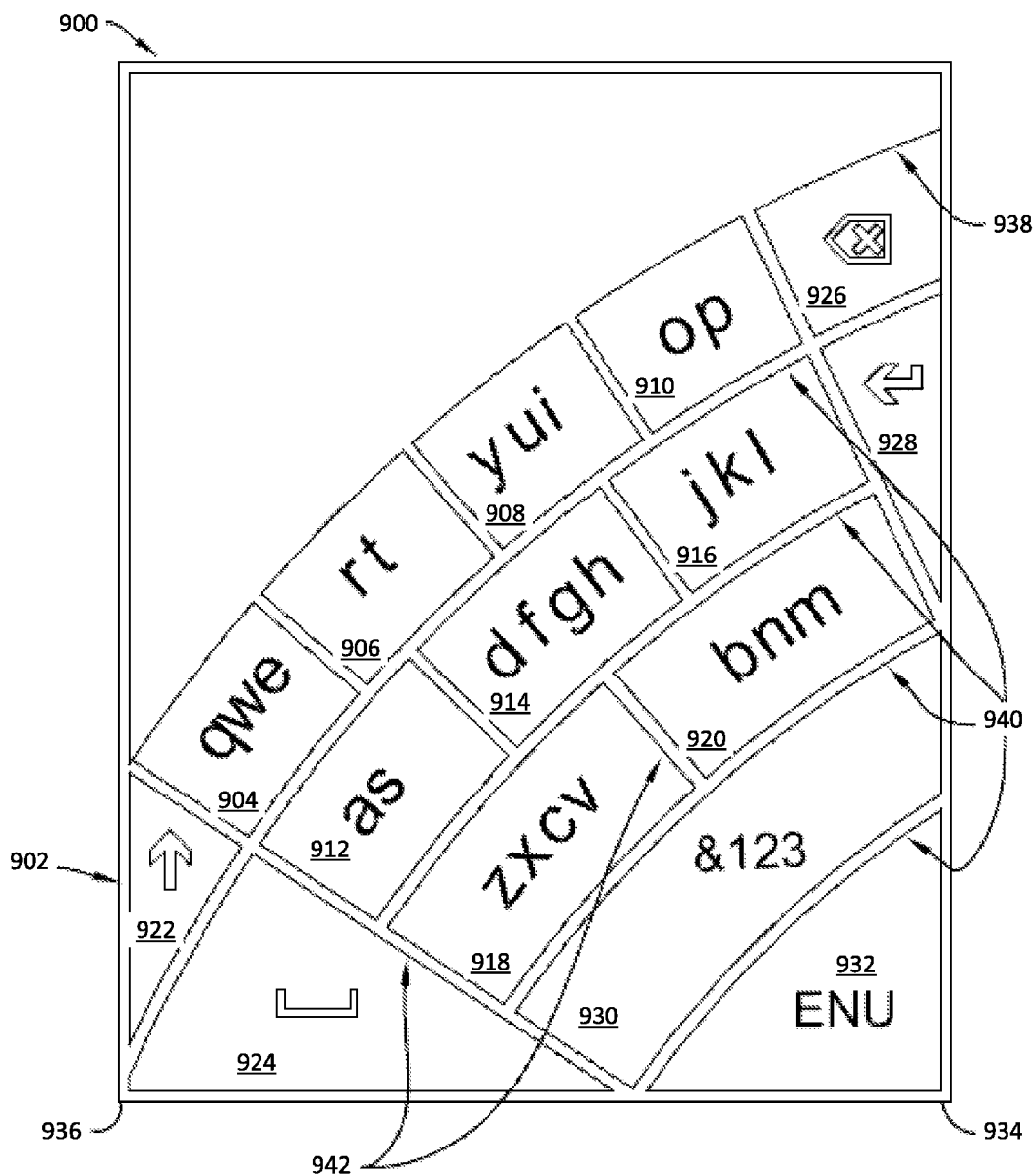

FIG. 9 shows a touchscreen 900 with another embodiment of a SIP 902 having letter group keys 904-920. These letter keys are also each associated with more than one letter, though the keys 904-920 are grouped differently than the keys 804-818. The SIP 902 has four letter keys 904-910 across the top row, whereas the SIP 802 has three letter keys 804-808 across the top row, allowing fewer letters on some of the keys of the SIP 902. In various different embodiments, the letters can be grouped in any different manner on any number of different keys of various sizes and positions.

In some embodiments, a SIP can comprise a key that switches the SIP back and forth between having one key for every letter and having one or more keys having groups of letters associated with them. Thus, a user can use such a key to select a text entry style from these different options, depending on particular circumstances or preferences.

In some embodiments, the non-letter keys, such as the keys 922, 924, 926, 928, 930, and 932 can maintain their general position relative to the letter keys when the SIP 902 is switched from one side of the touchscreen to the other, as when a user switches hands. For example, in some embodiments, the spacebar key can remain in a position below the letter keys whether the SIP 902 is on the left or the right side. In other embodiments, the spacebar key can remain to the left, or to the right, of the letter keys whether the SIP is on the left or the right side. In other embodiments, the space bar key can remain positioned adjacent the bottom edge of the touchscreen to the side of the letter keys, as in FIG. 8, such that the spacebar key is to the left of the letter keys when the SIP 902 is on the right side and the spacebar key is on the right side of the letter keys when the SIP 902 is on the left side. Other keys, such as the return key, backspace key, and capitals key can similarly be configured to maintain their positional relationship to the letter keys and/or to each other as the SIP 902 is switched from side to side.

As a user's thumb reaches farther up the SIP 902, the flatter pad of the thumb is used to touch the SIP 902, resulting in a larger contact area when touching the SIP farther from the bottom corner. On the other hand, when the thumb is bent sharply to reach the keys closer to the bottom corner of the SIP 902, the tip of the thumb is used to touch the keys, resulting in a smaller contact area. Thus, in some embodiments, some keys can have different heights and/or areas than other keys. In some embodiments, different rows of keys can have different heights and/or areas than other rows of keys. For example, in some embodiments, the keys farther from the bottom corner of the touchscreen 900 can have a larger height and/or area than the keys closer to the bottom corner. The outermost or uppermost row of keys can have a greater height than the lower rows of keys. The height of the keys can increase gradually from row to row as a function of the distance of the row from the bottom corner to correspond to the flattening of the thumb as it reaches farther up the SIP 902.

The SIP 902 shown in FIG. 9 comprises three rows of alphabetical character keys (also referred to as letter keys), wherein each key in the rows of keys represents alphabetical characters. The first row is composed of four keys: the key 904, which represents the characters "Q," "W," and "E," the key 906, which represents the characters "R" and "T," the key 908, which represents the characters "Y," "U," and "I," and the key 910, which represents the characters "O" and "P." The second row of keys is composed of three keys: the key 912, which represents the characters "A" and "S," the key 914, which represents the characters "D," "F," "G," and "H," and the key 916, which represents the characters "J," "K," and "L." The third row is composed of two keys: the key 918, which represents the characters "Z," "X," "C," and "V," and the key 920, which represents the characters "B," "N," and "M." Accordingly, the rows of alphabetical characters in the SIP 902 include a row with four keys, a row with three keys, and a row with two keys. When choosing character groupings in the keys, for instance, constraints can be set forth, including the constraint that the characters are sequentially arranged in accordance with a QWERTY keyboard, and the constraint on the number of keys in each row. The character groupings across the keys can be optimized for disambiguating words in a dictionary (weighted by frequency of use, for instance) given the constraints.

FIGS. 8-13 show several different embodiments of SIPs having different combinations of the characteristics described above. The SIPs 802, 902, and 1302 in FIGS. 8, 9, and 13, respectively, comprise arced boundaries in the angular direction and linear boundaries in the radial direction. The SIPs 1002, 1102, and 1202 in FIGS. 10, 11, and 12, respectively, comprise slanted linear boundaries instead of angular/radial boundaries.

Figure 10:
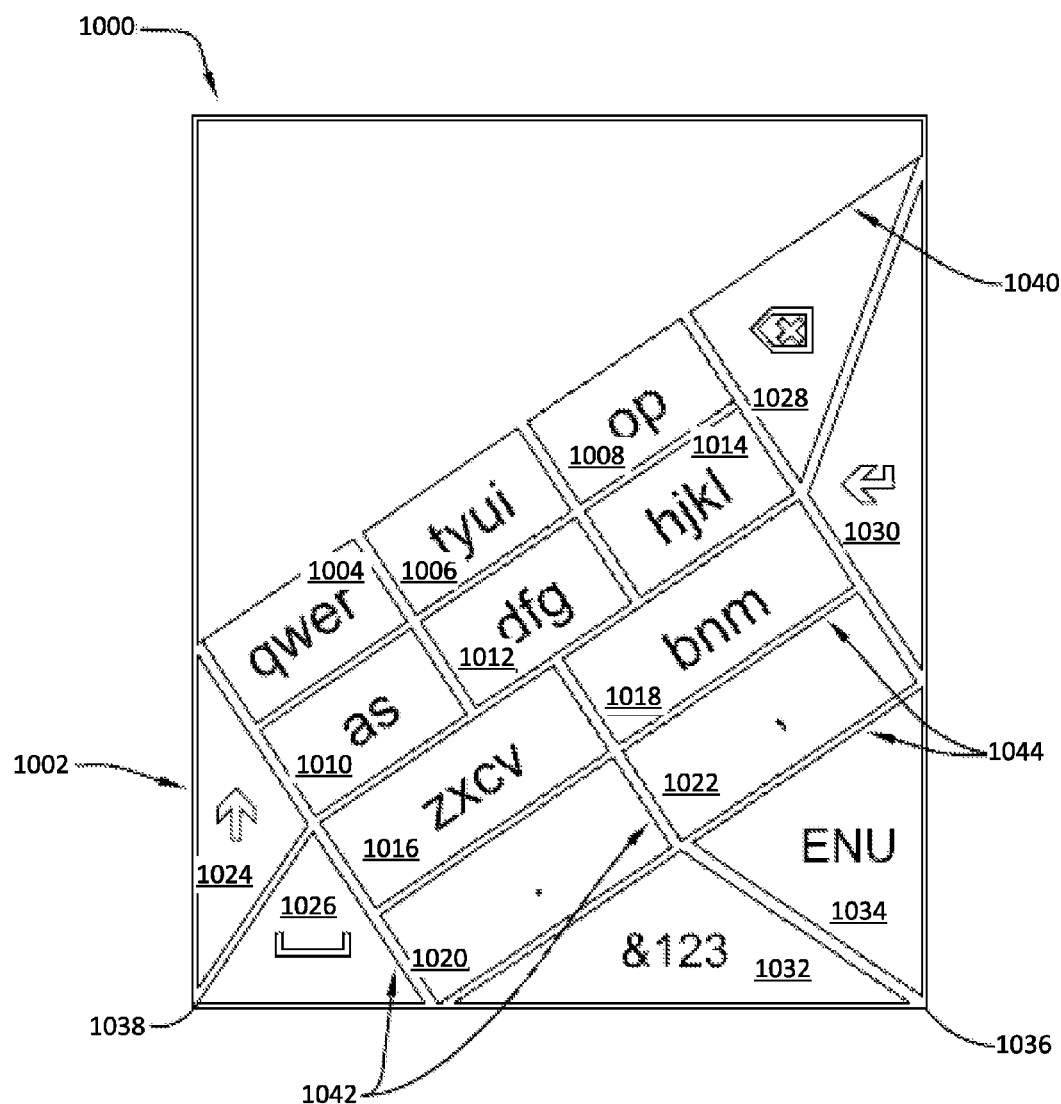

FIG. 10 shows a touchscreen 1000 having an embodiment of a SIP 1002 comprising keys 1004-1034 that each has a polygonal shape with linear boundaries. The keys 1004-1022 each have a rectangular shape defined by linear boundaries, some of which are labeled 1042, that slant from the bottom right toward the top left, and linear boundaries, some of which are labeled 1044 and 1040, that are perpendicular to the boundaries 1042. The keys 1024 through 1034 are triangular, being partially defined by the slanted boundaries 1042, 1044, and 1040, and partially defined by the orthogonal bottom and side edges of the touchscreen 1000. The keys 1004-1018 are arranged similarly as in the SIP 802 of FIG. 8, with similar groupings of characters across the letter keys 1004-1018.

Figure 11:
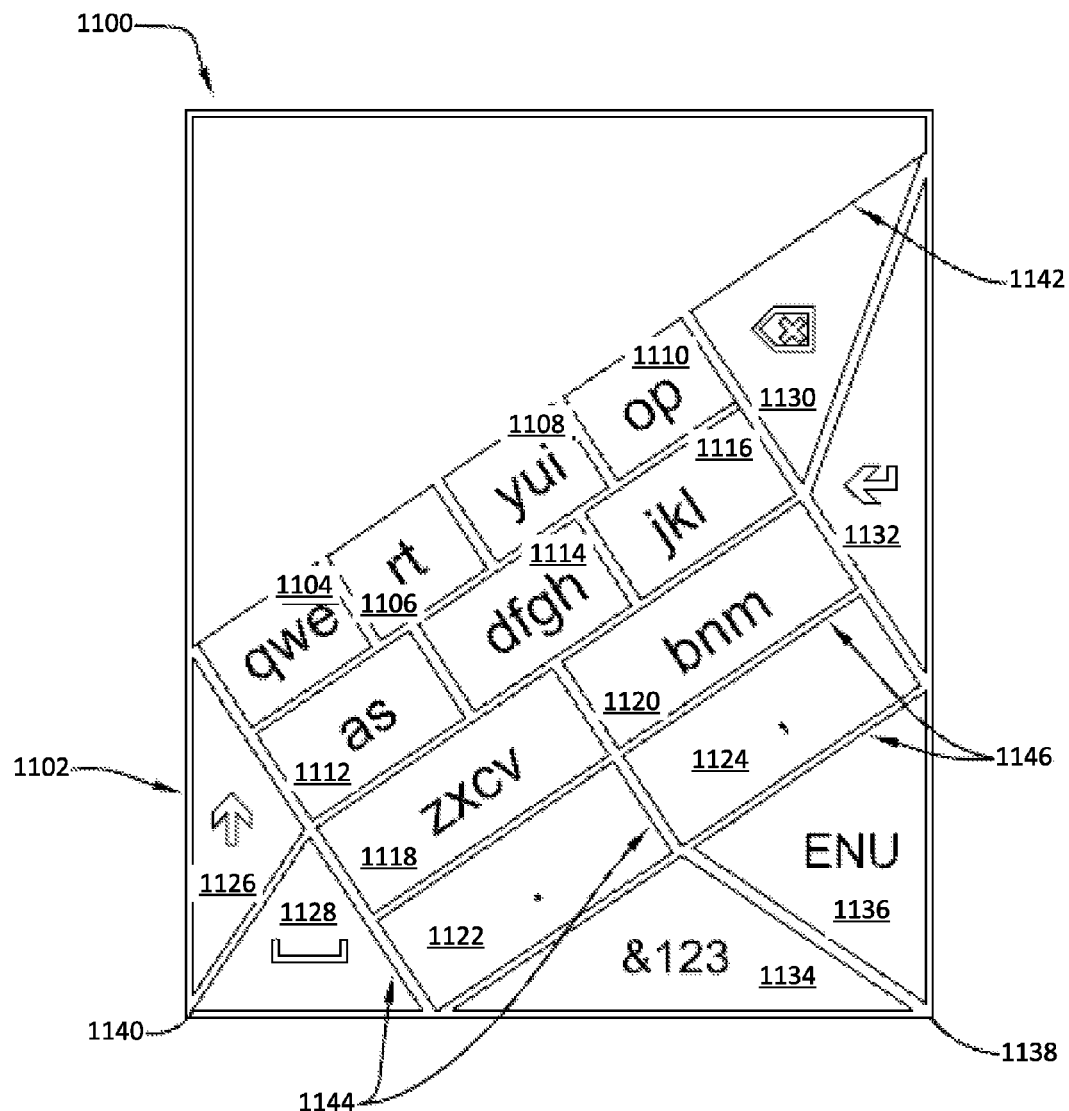

FIG. 11 shows another touchscreen 1100 having an embodiment of a SIP 1102 comprising keys 1104 through 1136 that each has a polygonal shape with linear boundaries. The keys 1104 through 1124 each have a rectangular shape defined by linear boundaries, some of which are labeled 1144, that slant from the bottom right toward the top left, and linear boundaries, some of which are labeled 1146 and 1142, that are perpendicular to the boundaries 1144. The keys 1126 through 1136 are triangular, being partially defined by the slanted boundaries 1142, 1144, and 1146, and partially defined by the orthogonal bottom and side edges of the touchscreen 1100. The keys 1104-1120 are arranged similarly as in the SIP 902 of FIG. 9, with similar groupings of characters across the letter keys 1104-1120.

Figure 12:
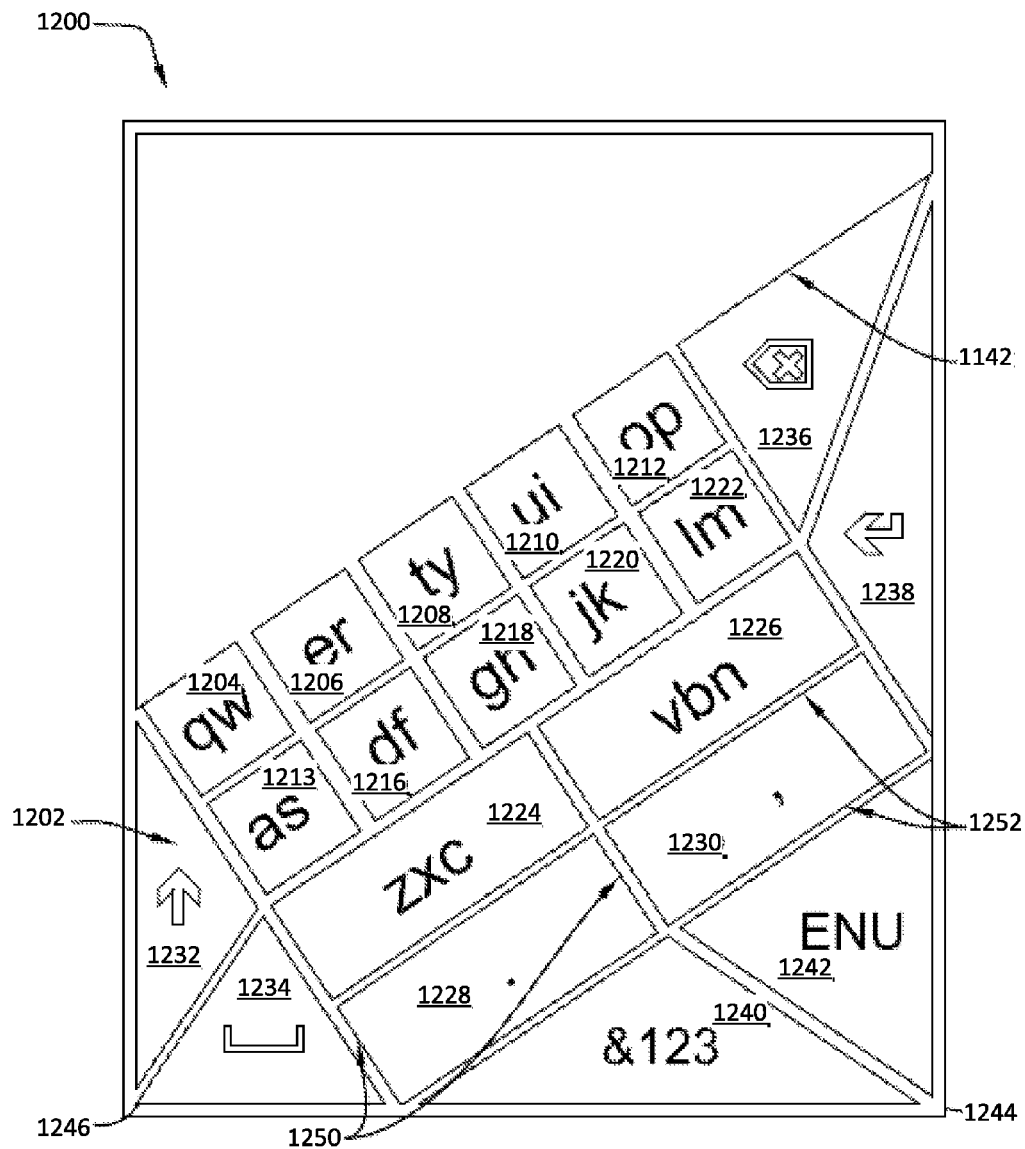

FIG. 12 shows yet another touchscreen 1200 having an embodiment of a SIP 1202 comprising keys 1204 through 1242 that each has a polygonal shape with linear boundaries. The keys 1204 through 1230 each have a rectangular shape defined by linear boundaries, some of which are labeled 1250, that slant from the bottom right toward the top left, and linear boundaries, some of which are labeled 1252 and 1246, that are perpendicular to the boundaries 1250. The keys 1232 through 1242 are triangular, being partially defined by the slanted boundaries 1246, 1250, and 1252, and partially defined by the orthogonal bottom and side edges of the touchscreen 1200.

The SIP 1202 includes three rows of letter keys, wherein a first row is composed of five keys: 1204-1212, wherein the key 1204 represents the characters "Q" and "W," the key 1206 represents the characters "E" and "R," the key 1208 represents the characters "T" and "Y," the key 1210 represents the characters "U" and "I," and the key 1212 represents the characters "O" and "P." The second row is also composed of five keys: 1214-1222, wherein the key 1214 represents the characters "A" and "S," the key 1216 represents the characters "D" and "F," the key 1218 represents the characters "G" and "H," the key 1220 represents the characters "J" and "K," and the key 1222 represents the characters "L" and "M." The third row is composed of two keys: 1224 and 1226, wherein the key 1224 represents the characters "Z," "X," and "C," and the key 1226 represents the characters "V," "B," and "N." Therefore, the SIP 1202 comprises two rows of letter keys that each include five keys and a row of letter keys that include two keys. Further, the SIP 1202 comprises keys representative of two alphabetical characters and three alphabetical characters, but fails to include a key that is representative of four alphabetical characters. With respect to the SIP 1202, the constraints imposed when determining a manner in which to group alphabetical characters can be a sequence of the characters (QWERTY), a number of rows of characters (e.g., 3), and a number of keys in each of the rows.

Additionally, as shown, the SIP 1202 comprises a fourth row that includes keys 1228 and 1230, wherein such keys are representative of respective punctuation marks, such as a period and comma. The fourth row may additionally include other keys that are representative of punctuation marks commonly used, such as a question mark, colon, semicolon, etc. Still further, the SIP 1202 comprises the key 1240, which is split from the key 1242.

Figure 13:
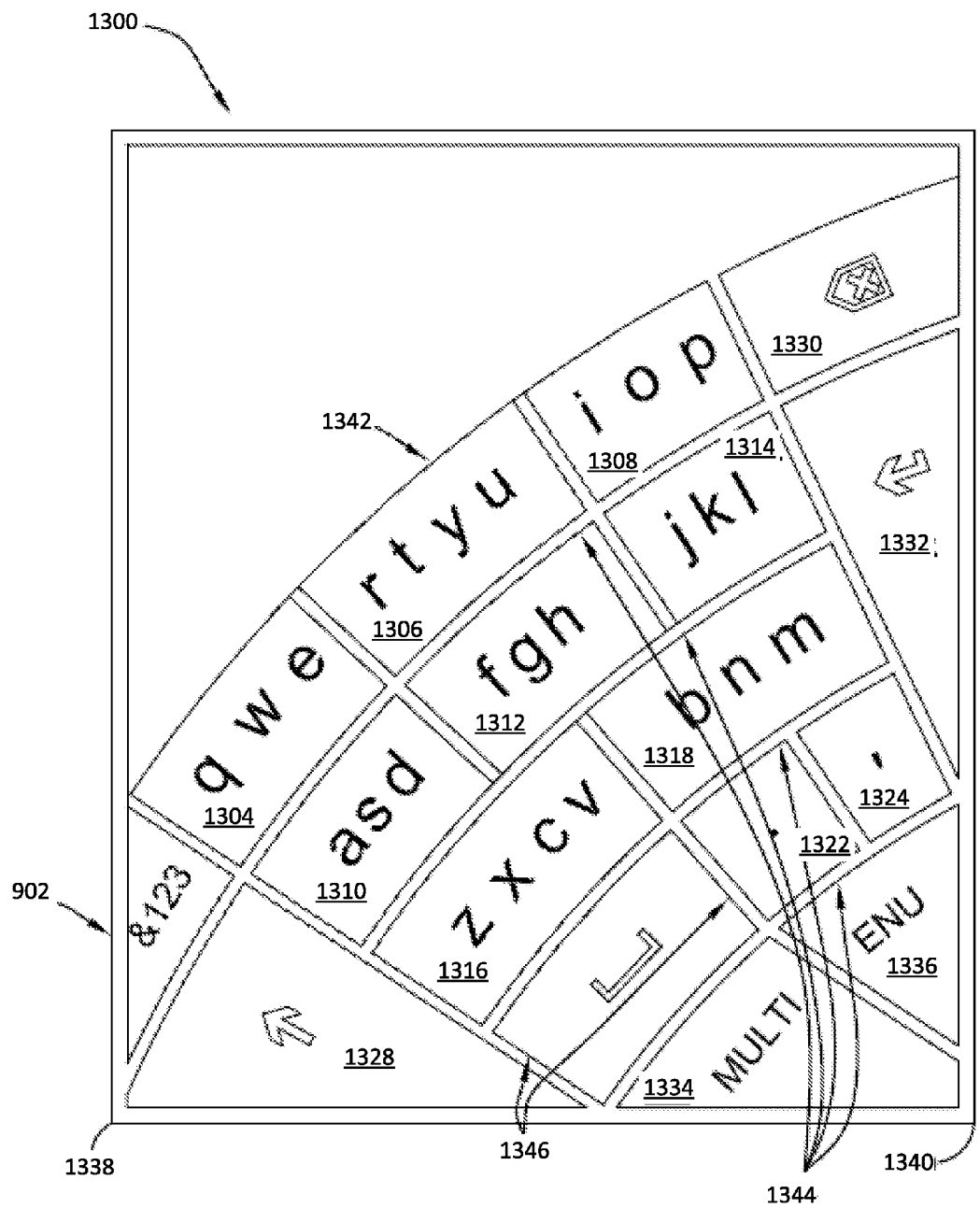

FIG. 13 shows a touchscreen 1300 having an embodiment of a SIP 1302 comprising keys 1304 through 1336 that are partially defined by linear slanted radial boundaries, some of which are labeled 1346, partially defined by curved or arced boundaries 1342 and 1344, and/or partially defined by the side edges and bottom edge of the touchscreen 1300, much like the SIPs 802 and 902 in FIGS. 8 and 9. The SIP 1302 can include a "MULTI" key 1334 that allows a user to switch to an alternative key layout, such as a layout having a different key for each letter in the alphabet. This can allow a user to manually type in words that the disambiguation program does not suggest, such as words that are not stored in dictionary of words that the disambiguation program relies upon.

The SIP 1302 comprises three rows of letter keys. A first row is composed of three keys: the key 1304, which represents the characters "Q," "W," and "E," the key 1306, which represents the characters "R," "T," "Y," and "U." and the key 1308, which represents the characters "I," "O," and "P." A second row is composed of three keys: the key 1310, which represents the characters "A," "S," and "D," the key 1312, which represents the characters "F," "G," and "H," and the key 1314, which represented the characters "J," "K," and "L." A third row is composed of two keys: the key 1316, which represents the characters "Z," "X," "C," and "V," and the key 1318, which represents the characters "B," "N," and "M." The groupings of characters with the keys, in the SIP 1302, as noted above, can be undertaken to optimize disambiguation of words in a particular dictionary (e.g., the dictionary of words employed by a user of the mobile device that includes the SIP 1302) given specified layout constraints.

The SIPs 1002, 1102, and 1202 differ in the grouping of the letters on the letter keys and the number of the letter keys. The SIP 1002 comprises three keys 1004, 1006, 1008 in the uppermost row of letter keys and the three keys 1010, 1012, 1014 in the second row of letter keys. The SIP 1102 comprises four keys 1104, 1106, 1108, 1110 in the uppermost row of letter keys, and three keys 1112, 1114, 1116 in the second row of letter keys. The SIP 1202 comprise five keys 1204 through 1212 in the uppermost row of letter keys, and five keys 1214 through 1222 in the second row of letter keys. The ten keys 1204 through 1222 in the SIP 1202 each have the same height and width, and each correspond to two letters.

While the SIPs 1002, 1102, and 1202 do not comprise curved or arced rows of keys like the SIPs 802 and 902, they can similarly be configured be accessible by a user's thumb reaching from either of the bottom corners of the touchscreen, and can be sized and switched between the two bottom corners in similar manners. Furthermore, with respect to any of the SIPs described herein, a gesture can cause an SIP to be unhidden (displayed on a touchscreen) or hidden (removed from display on the touchscreen). Furthermore, any of the SIP features described herein can be applied to both the arced SIPs 802 and 902 and the slanted SIPs 1002, 1102 and 1202 in similar manners.

In some embodiments, the SIP can comprise a key, such as the language key 830, which allows the user to switch between different languages. In some embodiments, the SIP can be configured to be used with non-Latin languages, such as Arabic. In such cases, the layout of the keys and boundaries of the SIP can be adjusted to fit different numbers of characters and other functions that are used for text entry in other languages. Thus, when a user hits the language key to switch to a different language, the layout of the SIP can automatically adjust to a different layout to accommodate the different language.

While the keyboard layouts have been described as being for SIPs in FIGS. 8-13, it is to be understood that such keyboard layouts can be included in other touch-sensitive input panels that facilitate text entry by way of shapewriting. Furthermore, with respect to any of the SIPs shown in FIGS. 8-13, haptic feedback can be provided to assist the user in localizing a digit relative to one or more keys as well as to assist the user in generating text. For example, haptic feedback can be provided at borders between keys, such that the user perceives greater surface friction at borders when the digit transitions over such borders.

Figure 14:
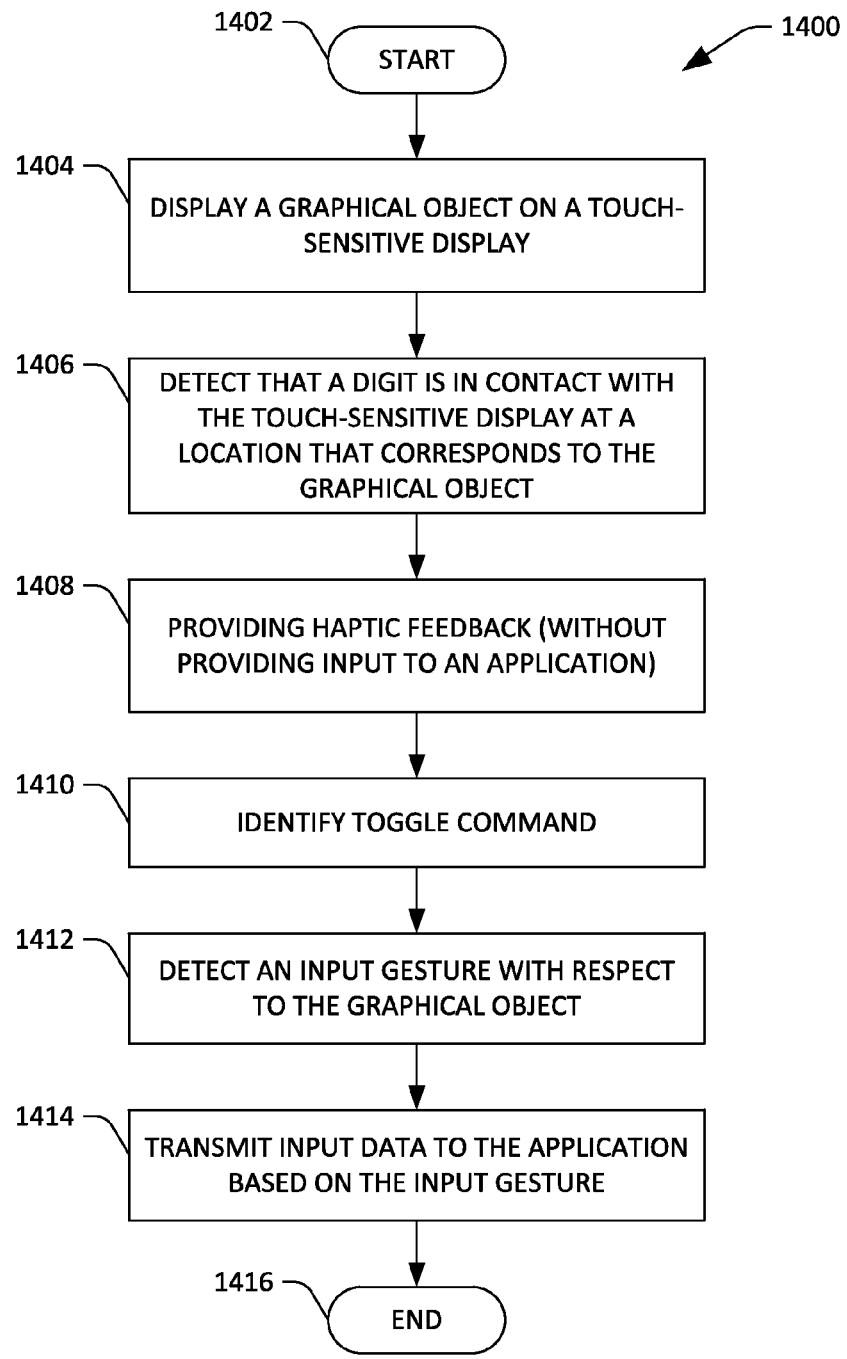
FIG. 14 is a flow diagram that illustrates an exemplary methodology for providing haptic feedback to a user as the user interacts with a touch-sensitive display of a mobile computing device.
Figure 15:
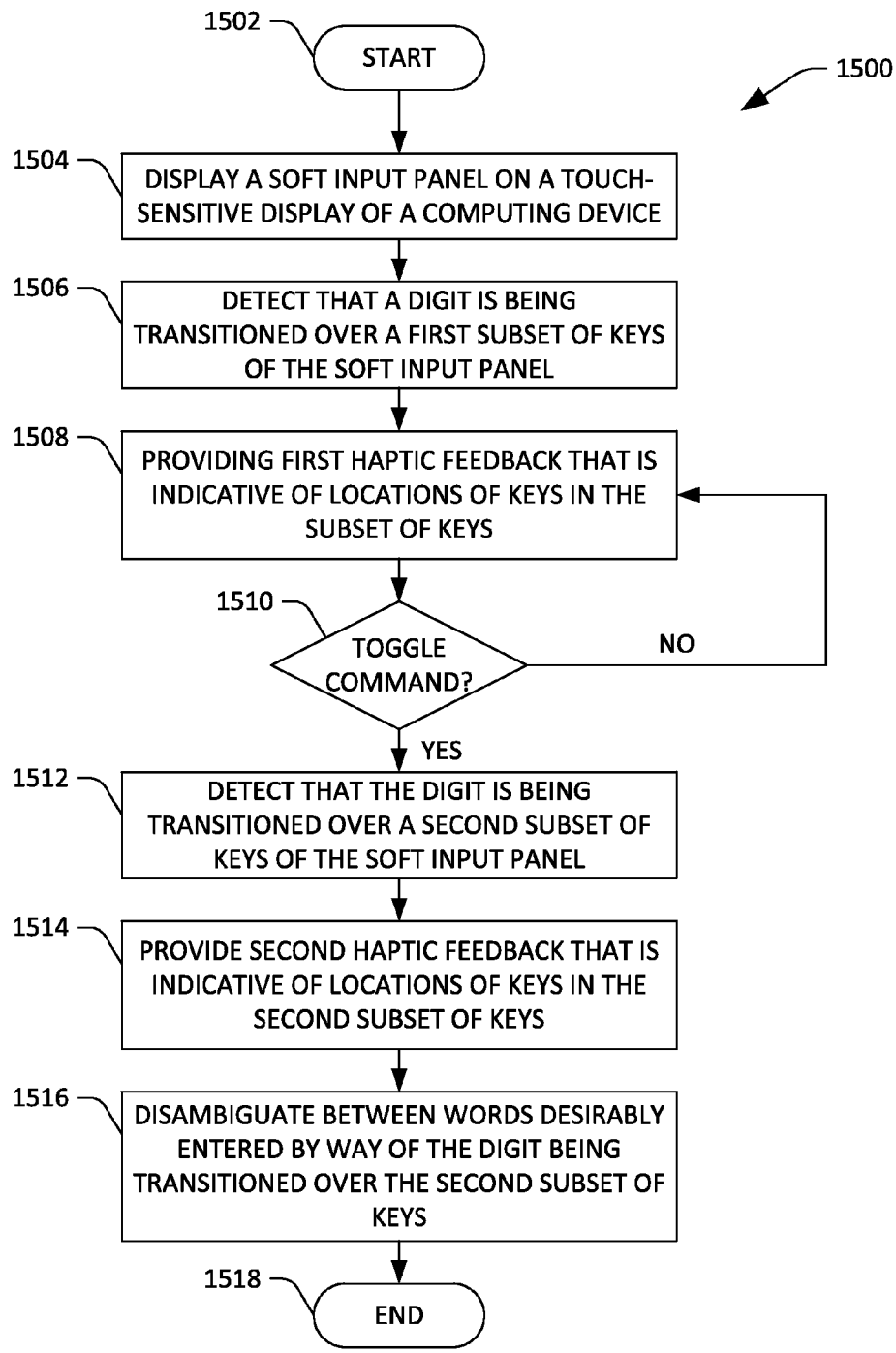
FIG. 15 is a flow diagram that illustrates an exemplary methodology for providing haptic feedback to a user to assist the user in setting forth text by way of shapewriting.
Figure 16:
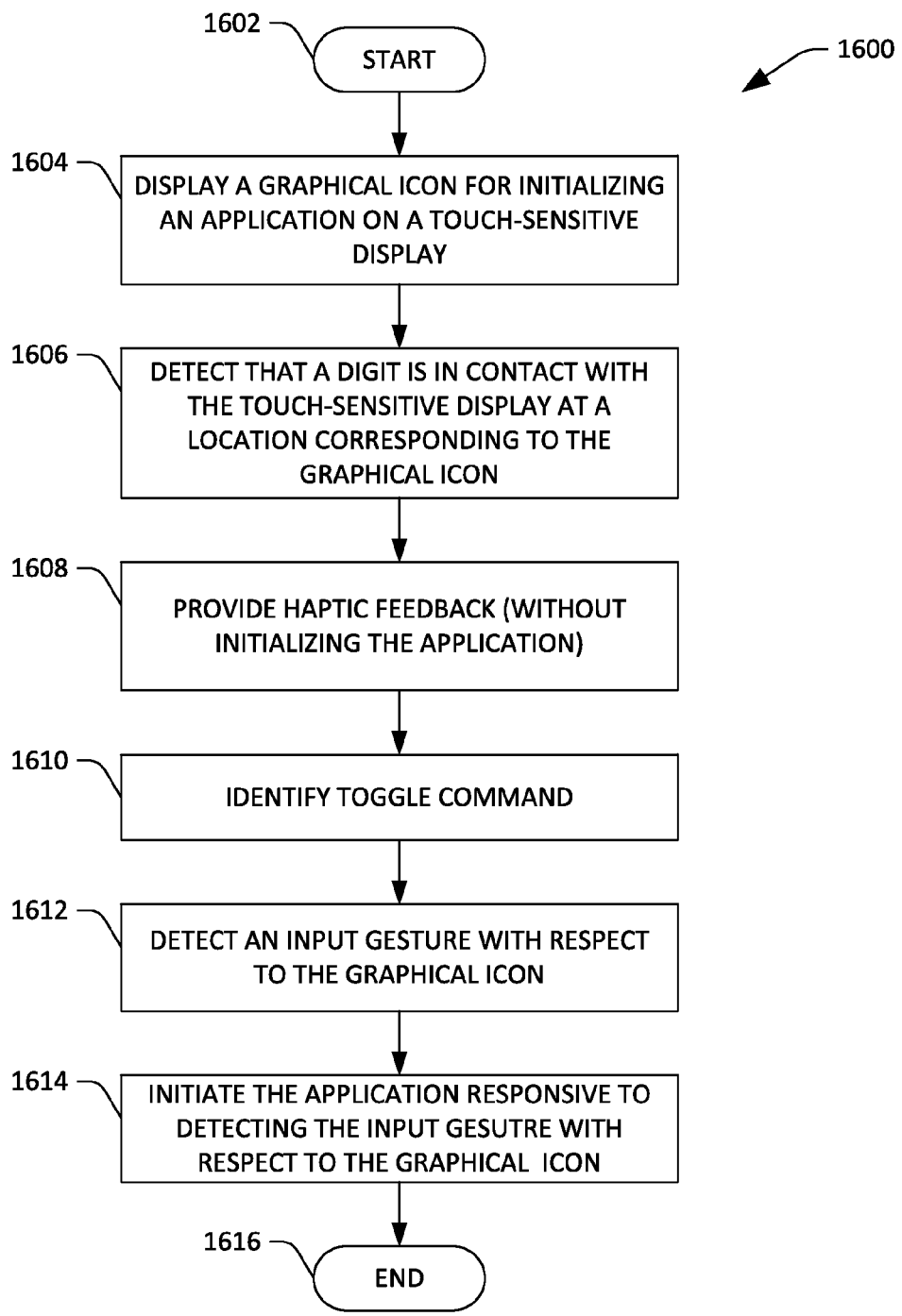
FIG. 16 is a flow diagram that illustrates an exemplary methodology for providing haptic feedback to a user to assist the user in initiating an application installed on a computing device that has a touch-sensitive display.

FIGS. 14-16 illustrate exemplary methodologies relating to provision of haptic feedback to users of computing devices having touch-sensitive displays. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 14, an exemplary methodology 1400 that facilitates eyes-free interaction with a touch-sensitive display is illustrated. The methodology 1400 starts at 1402, and at 1404 a graphical object is displayed on the touch-sensitive display. For instance, the graphical object can correspond to an application installed on a computing device that includes the touch-sensitive display. As noted above, such application may be a text entry application that utilizes a soft input panel to generate text. Accordingly, the graphical object may be a key in the soft input panel.

At 1406, a digit is detected as being in contact with the touch-sensitive display at a location that corresponds to the graphical object. Such location may be anywhere on the graphical object, at the center of the graphical object, or at a border immediately adjacent to the graphical object that separates the graphical object from another graphical object.

At 1408, responsive to detecting that the digit is in contact with the touch-sensitive display at the location that corresponds to the graphical object, haptic feedback is provided to the digit without providing input to the application that corresponds to the graphical object. For example, such haptic feedback can be perceived by the user when the digit is transitioning over the touch-sensitive display. Thus, the location may be, for example, on the graphical object, and as the user moves the digit while remaining on the graphical object, the user can perceive that the surface is somewhat rough compared to another location on the touch-sensitive display. As described above, such haptic feedback can be employed to assist the user in ascertaining where on the touch-sensitive display the digit of the user is relative to the graphical object.

At 1410, subsequent to providing the haptic feedback, a toggle command set forth by the user is identified. Such toggle command can be an increase in pressure applied by the user to the touch-sensitive-display using the digit, a removal of the digit from the touch-sensitive display, a voice command, a tilting of the computing device, a shaking of the computing device, a double tap, etc. At 1412, subsequent to the identifying of the toggle command, an input gesture with respect to the graphical object is detected. For instance, such input gesture may be a stroke (swipe) over the graphical object. In another example, the input gesture may be a tap, a double tap, a pinch, a rotation, or other suitable gesture that can be set forth on a touch-sensitive display. At 1414, input data is transmitted to the application based upon the input gesture. Additionally, optionally, other haptic feedback can be provided as the user is setting forth the input gesture. The methodology 1400 completes 1416.

Now referring to FIG. 15, an exemplary methodology 1500 for providing haptic feedback for purposes of assisting in localizing a digit relative to a graphical object on a touch-sensitive display and for assisting a user in generating text via shapewriting is illustrated. The methodology 1500 starts at 1502, and 1504 a soft input panel is displayed on a touch-sensitive display of a computing device. In an exemplary embodiment, the soft input panel can comprise a plurality of selectable keys, wherein each key in the plurality of keys represents a respective plurality of characters. Furthermore, the soft input panel can be used by an application for purposes of generating text.

At 1506, a digit is detected as being transitioned over a first subset of keys in the plurality of keys. For example, a user can swipe a digit over the first subset of keys.

At 1508, responsive to detecting that the digit as being transitioned over the first subset of keys in the plurality of keys, first haptic feedback is provided, wherein the first haptic feedback is indicative of locations on the touch-sensitive display of respective keys in the first subset of keys being transitioned over by the digit. This can be done for purposes of assisting the user in locating one or more keys in the subset of keys. Accordingly, input is not provided to the text generation application.

At 1510, a determination is made regarding whether a toggle command has been detected. If the toggle command has not been detected, then the methodology returns to 1508, where haptic feedback is provided to the user as the user moves the digit over the touch-sensitive display. If a toggle command is detected, which indicates that the user wishes to generate text and provide input to the text generation application, then at 1512, the digit is detected as being transitioned over a second subset of keys in the plurality of keys. Thus, the user is employing shapewriting to generate text by, for example, connecting keys that represent characters in a desirably generated word.

At 1514, second haptic feedback is provided, wherein the second haptic feedback is indicative of locations on the touch-sensitive display of respective keys in the second subset of keys being transitioned over by the digit. At 1516, input data is provided to the text generation application based upon the detecting that the digit is being transitioned over the second subset of keys of the soft input panel. The methodology 1500 completes at 1518.

Turning now to FIG. 16, an exemplary methodology 1600 that facilitates providing haptic feedback to assist a user in connection with initiating an application on a computing device that comprises a touch-sensitive display is illustrated. The methodology 1600 starts at 1602, and 1604 a graphical icon that initiates an application, when selected, is displayed on a smooth touch-sensitive display. Such graphical icon can be displayed together with a plurality of other selectable graphical icons.

At 1606, a digit of the user is detected as being at a location corresponding to the graphical icon on the touch-sensitive display. Again, such location may be anywhere on the graphical icon, at a center of the graphical icon, at a border that separates the graphical icon from some other graphical icon, etc.

At 1608, first haptic feedback is provided based upon the detecting that the digit of the user is at the location that corresponds to the graphical icon. Such haptic feedback assists the user in recognizing the location of the graphical icon on the touch-sensitive display without requiring the user to look at the touch-sensitive display. It 1610, a toggle command set forth by the user is identified. At 1612, subsequent to identifying the toggle command, an input gesture with respect to the graphical icon is detected. For instance, such input gesture may be a tapping or double tapping of the graphical icon. At 1614, the application is initiated responsive to the detecting that the input gesture has been made with respect to the graphical icon. The methodology 1600 completes at 1616.

Figure 17:
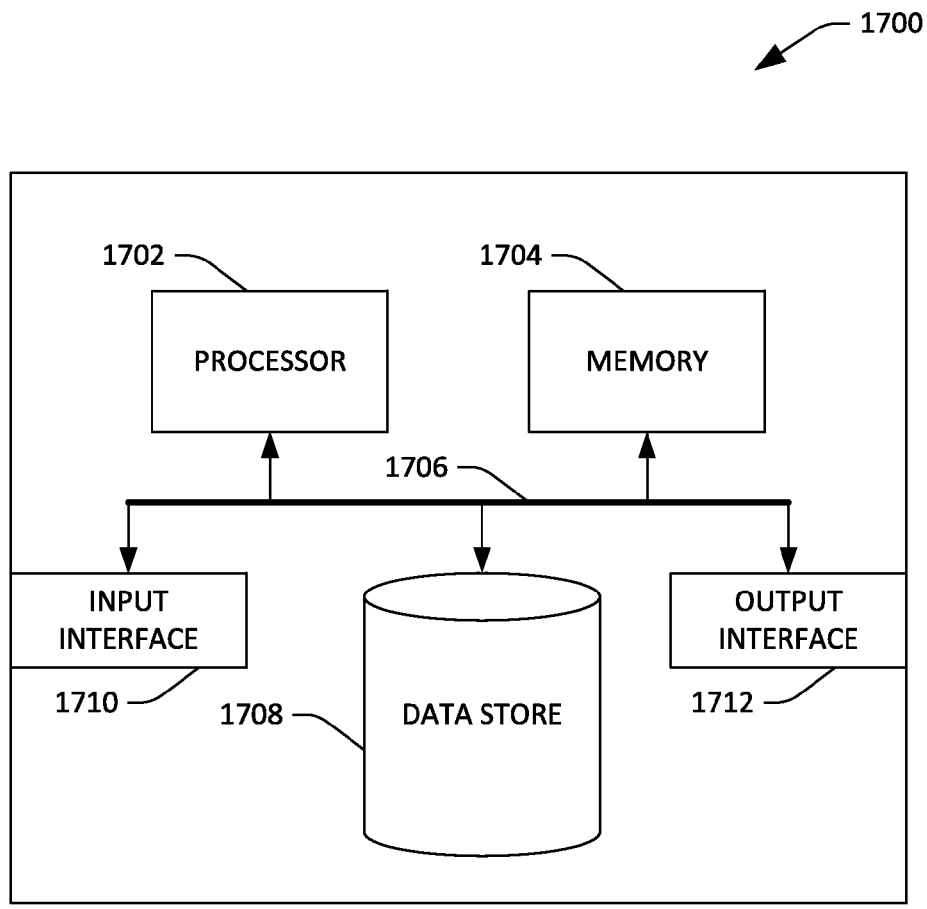
FIG. 17 is an exemplary computing system.

Referring now to FIG. 17, a high-level illustration of an exemplary computing device 1700 that can be used in accordance with the systems and methodologies disclosed herein is illustrated. For instance, the computing device 1700 may be used in a system that provides haptic feedback to facilitate eyes-free interaction with a touch-sensitive display. By way of another example, the computing device 1700 can be used in a system that supports shapewriting. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store locations of graphical objects on a touch-sensitive display, a shapewriting model, a language model, and so forth.

The computing device 1700 additionally includes a data store 1708 that is accessible by the processor 1702 by way of the system bus 1706. The data store 1708 may include executable instructions, defined locations where haptic feedback is desirably provided, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc. by way of the output interface 1712.

It is contemplated that the external devices that communicate with the computing device 1700 via the input interface 1710 and the output interface 1712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1700 may be a distributed system. Thus, for instance, several devices may be in communication by way of a network connection and may collectively perform tasks described as being performed by the computing device 1700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed on a computing device having a touch-sensitive display with a smooth surface, the method comprising:
   displaying a soft input panel on the touch-sensitive display, the soft input panel configured for use in providing input to an application installed on the computing device, the soft input panel comprises keys that are representative of characters;
   detecting that a digit is in contact with the touch-sensitive display at a location corresponding to the soft input panel;
   responsive to the detecting the digit is in contact with the touch-sensitive display at the location corresponding to the soft input panel, providing first haptic feedback without providing input to the application, the first haptic feedback provided based upon the digit being in contact with the touch-sensitive display at the location corresponding to the soft input panel;
   subsequent to providing the first haptic feedback, identifying a toggle command, the toggle command indicates that immediately subsequently detected strokes over the touch-sensitive display at locations corresponding to the soft input panel are to be interpreted as input commands;
   subsequent to the identifying of the toggle command, detecting a sequence of strokes over the keys of the soft input panel by the digit, wherein the digit is detected as maintaining contact with the touch-sensitive display from when the first haptic feedback is provided through when the sequence of strokes is detected;
   providing second haptic feedback based upon a detected location of the digit relative to a key in the keys when the sequence of strokes is detected; and
   transmitting input data to the application based upon the detected sequence of strokes.

2. The method of claim 1, wherein the location corresponding to the soft input panel is on a key of the soft input panel.

3. The method of claim 1, wherein the location corresponding to the soft input panel is a border between keys of the soft input panel.

4. The method of claim 1, each key in the keys representing a respective plurality of alphabetical characters.

5. The method of claim 4, wherein the sequence of strokes comprises a stroke that passes over a border between two keys in the plurality of keys, the method further comprising:
   detecting that the stroke passes over the border;
   responsive to detecting that the second stroke passes over the border, providing the second haptic feedback.

6. The method of claim 4, wherein the sequence of strokes comprises a stroke that passes over a first key in the keys and thereafter passes over a second key in the keys, the first key and the second key being adjacent to one another, the method further comprising:
   responsive to detecting that the digit is located over the first key during the stroke, providing the second haptic feedback;
   responsive to detecting that the digit has transitioned from the first key to the second key ceasing to provide the second haptic feedback.

7. The method of claim 6, further comprising disambiguating between a first word and a second word for input to the application based upon the stroke.

8. The method of claim 1, wherein providing the first haptic feedback comprises providing electrostatic haptic feedback, and wherein a user perceives alteration in friction of a region of the touch-sensitive display when the electrostatic feedback is provided.

9. The method of claim 1, further comprising identifying the input data based upon the detected sequence of strokes, the input data comprises a word.

10. The method of claim 1, further comprising:
    responsive to the detecting that the digit is in contact with the touch-sensitive display at the location corresponding to the soft input panel, providing auditory feedback that indicates that the digit is in contact with the touch-sensitive display at the location corresponding to the soft input panel.

11. A computer-readable storage medium comprising instructions that, when executed by a processor, cause the processor to perform acts comprising:
displaying a soft input panel on a touch-sensitive display of a computing device, the soft input panel comprising a plurality of keys, each key in the plurality of keys representing a respective plurality of characters, the soft input panel being usable to set forth text to an application;
detecting a transition of a digit from a first key in the plurality of keys to a second key in the plurality of keys, wherein the digit maintains contact with the touch-sensitive display during the transition;
providing haptic feedback to the digit during the transition of the digit from the first key in the plurality of keys to the second key in the plurality of keys without providing input to the application, the haptic feedback being indicative of a location of the first key in the plurality of keys relative to a location of the second key in the plurality of keys;
subsequent to providing the haptic feedback, detecting a toggle command that indicates that subsequent strokes of the digit are to cause text to be provided to the application;
detecting a sequence of strokes by the digit over the soft input panel subsequent to detecting the toggle command;
providing additional haptic feedback to the digit as the digit transitions over keys in the soft input panel; and
providing input to the application based upon the sequence of strokes detected over the soft input panel, wherein the digit is detected as maintaining contact with the touch-sensitive display during and between the acts of detecting the transition, providing the haptic feedback to the digit, detecting the toggle command, detecting the sequence of strokes, and providing input to the application.

12. The computer readable storage medium of claim 11, wherein detecting the toggle command comprises at least one of:
detecting that pressure applied to the touch-sensitive display by the digit exceeds a predefined threshold;
detecting a voice command set forth by a user of the computing device;
detecting that a signal output by at least one of an accelerator or gyroscope corresponds to the toggle command;
detecting that pressure applied to a bezel of the computing device exceeds a predefined threshold; or
detecting that orientation of the digit relative to the touch-sensitive display conforms to an orientation for the toggle command.

13. The computer-readable storage medium of claim 11, wherein detecting the toggle command comprises
detecting an area on the touch-sensitive display where the digit is in contact with the touch-sensitive display; and
detecting that the area is above a predefined threshold.

14. The computer-readable storage medium of claim 11, wherein the plurality of keys of the soft input panel are arranged in arcuate rows that are concentric with one another.

15. A computing device comprising:
at least one processor; and
memory that comprises instructions that, when executed by the at least one processor, cause the at least one processor to perform acts comprising:
responsive to detecting that a digit of a user has transitioned over a first object represented on a touch-sensitive display, providing first haptic feedback, wherein the computing device fails to provide input to an application executing on the computing device prior to a toggle command being detected;
detecting the toggle command subsequent to providing the first haptic feedback, where the toggle command indicates that an immediately transition over the touch-sensitive display at locations corresponding to objects represented on the touch-sensitive display are to be interpreted as input commands;
subsequent to detecting the toggle command:
detecting that the digit of the user has transitioned over a second object represented on the touch-sensitive display;
responsive to detecting that the digit of the user has transitioned over the second graphical object:
providing second haptic feedback; and
providing input to the application based upon the digit of the user transitioning over the second object, wherein the digit of the user maintains contact with the touch-sensitive display during and between transitioning over the first object and transitioning over the second object.

16. The computing device of claim 15, the first object being a first key of a soft input panel that represents a first alphabetical character, the second object being a second key of the soft input panel that represents a second alphabetical character.

17. The computing device of claim 16, the first key being representative of a first plurality of alphabetical characters, the second key being representative of a second plurality of alphabetical characters.

18. The computing device of claim 17, the first key being in a first row of the soft input panel, the second key being in a second row of the soft input panel, the first and second rows being arcuate and concentric with respect to one another.

19. The computing device of claim 17, a number of alphabetical characters represented by the first key is greater than a number of alphabetical characters represented by the second key, wherein size of the second key is greater than size of the first key.

20. The computing device of claim 17, wherein detecting the toggle command comprises detecting the toggle command based upon output of an accelerometer of the computing device indicating that the user has shaken the computing device.

* * * * *